US010348922B2

(12) United States Patent
Han

(10) Patent No.: US 10,348,922 B2
(45) **Date of Patent: *Jul. 9, 2019**

(54) INFORMATION PROCESSING SYSTEM, INFORMATION PROCESSING APPARATUS, IMAGE FORMING APPARATUS, INFORMATION PROCESSING METHOD, AND COMPUTER PROGRAM PRODUCT

(71) Applicant: Xiaofeng Han, Kanagawa (JP)

(72) Inventor: Xiaofeng Han, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/011,814

(22) Filed: Jun. 19, 2018

(65) Prior Publication Data

US 2018/0302525 A1 Oct. 18, 2018

Related U.S. Application Data

(63) Continuation of application No. 15/451,790, filed on Mar. 7, 2017, now Pat. No. 10,033,898.

(30) Foreign Application Priority Data

Mar. 17, 2016 (JP) ................................ 2016-054416
Oct. 5, 2016 (JP) ................................ 2016-197074

(51) Int. Cl.
*G06F 8/61* (2018.01)
*H04N 1/00* (2006.01)
(Continued)

(52) U.S. Cl.
CPC ....... *H04N 1/00938* (2013.01); *G06F 3/0482* (2013.01); *G06F 8/61* (2013.01);
(Continued)

(58) Field of Classification Search
CPC .......... G06F 3/0482; G06F 21/10; G06F 8/61; H04L 61/1511; H04L 63/0236;
(Continued)

(56) References Cited

U.S. PATENT DOCUMENTS 2,006,088 A 6/1935 Mitchell
5,873,068 A 2/1999 Beaumont et al.
(Continued)

FOREIGN PATENT DOCUMENTS

JP 2004-030081 A 1/2004
JP 2010-182309 A 8/2010
(Continued)

OTHER PUBLICATIONS

Extended European Search Report dated Jul. 26, 2017 issued in corresponding European Application No. 17159936.8.

*Primary Examiner* — Negussie Worku
(74) *Attorney, Agent, or Firm* — Harness, Dickey & Pierce, P.L.C.

(57) ABSTRACT

An information processing apparatus includes a screen information request receiver, an application identification information specifying unit, a screen information transmitter. The screen information request receiver receives, from a device, a screen information request used to request screen information for providing an application. The screen information includes at least dealer information representing a dealer that sells the device. The application identification information specifying unit specifies application identification information corresponding to the dealer information included in the screen information request based on application correspondence relation information representing a correspondence relation between the dealer information and the application identification information identifying an application available to the device. The screen information transmitter transmits, to the device, the screen information
(Continued)

SCREEN INFORMATION SERVING AS SOURCE OF APPLICATION LIST SCREEN
APP 1 NAME
APP 2 NAME
SELECT 511
SELECT 511
7 (APPLICATION SERVER)
(NETWORK) 8
3 (APP MARKET SERVER)
1 (MFP)
SCREEN INFORMATION REQUEST (INCLUDING DEALER INFORMATION (DEALER A/B/C))
2 (MANAGEMENT SERVER)

for providing the application identified by the application identification information specified by the application identification information specifying unit as a response to the screen information request received by the screen information request receiver.

14 Claims, 22 Drawing Sheets

(51) Int. Cl.

| | |
|---|---|
| ***H04L 29/06*** | (2006.01) |
| ***G06F 21/10*** | (2013.01) |
| ***G06F 3/0482*** | (2013.01) |
| *H04L 29/12* | (2006.01) |

(52) U.S. Cl.

CPC ......... *G06F 21/10* (2013.01); *H04N 1/00344* (2013.01); *H04N 1/00464* (2013.01); *H04N 1/00973* (2013.01); *H04L 61/1511* (2013.01); *H04L 63/0236* (2013.01); *H04N 2201/0039* (2013.01); *H04N 2201/0094* (2013.01)

(58) Field of Classification Search

CPC ........... H04N 1/00344; H04N 1/00464; H04N 1/00938; H04N 1/00973; H04N 2201/0039; H04N 2201/0094

USPC .................................................. 358/1.15, 442

See application file for complete search history.

(56) References Cited

U.S. PATENT DOCUMENTS

| | | | | |
|---|---|---|---|---|
| 7,103,568 | B1 | 9/2006 | Fusz et al. | |
| 7,177,552 | B2 | 2/2007 | Koike | |
| 7,181,150 | B2 | 2/2007 | Miyazaki | |
| 7,395,223 | B1 | 7/2008 | Buzzell et al. | |
| 7,428,404 | B2 | 9/2008 | Kawaguchi | |
| 8,248,427 | B2 * | 8/2012 | Han | G03G 15/502 345/581 |
| 10,033,898 | B2 * | 7/2018 | Han | G06F 3/0482 |
| 2002/0038258 | A1 | 3/2002 | Inoue et al. | |
| 2003/0177020 | A1 | 9/2003 | Okamura | |
| 2005/0010480 | A1 | 1/2005 | Ishioka et al. | |
| 2005/0180701 | A1 | 8/2005 | Steinberg et al. | |
| 2008/0244057 | A1 | 10/2008 | Kojima | |
| 2010/0205274 | A1 | 8/2010 | Gharabally et al. | |
| 2013/0138460 | A1 | 5/2013 | Schumann, Jr. et al. | |
| 2013/0235407 | A1 | 9/2013 | Kobayashi | |
| 2014/0280462 | A1 | 9/2014 | Gharabally et al. | |
| 2015/0095085 | A1 | 4/2015 | Sweeney et al. | |
| 2015/0146243 | A1 * | 5/2015 | Tsujimoto | G06F 3/1207 358/1.15 |
| 2015/0310466 | A1 | 10/2015 | LaCivita et al. | |
| 2016/0034264 | A1 | 2/2016 | Hayashi | |
| 2016/0112493 | A1 | 4/2016 | Yasuhara | |
| 2016/0119491 | A1 | 4/2016 | Takeda | |
| 2016/0149885 | A1 | 5/2016 | Negoro | |
| 2016/0165088 | A1 | 6/2016 | Saitoh | |
| 2016/0182610 | A1 | 6/2016 | Satoh | |
| 2016/0337544 | A1 | 11/2016 | Han | |
| 2017/0078516 | A1 | 3/2017 | Ishizaki | |
| 2017/0083863 | A1 | 3/2017 | Yoshikawa | |
| 2017/0180387 | A1 | 6/2017 | Hayashi et al. | |
| 2018/0048701 | A1 | 2/2018 | Iwami et al. | |
| 2018/0139358 | A1 * | 5/2018 | Hirotani | H04N 1/6019 |
| 2018/0262492 | A1 * | 9/2018 | Daniel | H04L 63/0807 |
| 2018/0349080 | A1 * | 12/2018 | Oikawa | G06F 3/1291 |
| 2018/0349125 | A1 * | 12/2018 | Ito | G06F 8/65 |

FOREIGN PATENT DOCUMENTS

| | | | |
|---|---|---|---|
| JP | 2010-277580 | A | 12/2010 |
| JP | 2013250997 | A | 12/2013 |

* cited by examiner

| DEVICE IDENTIFICATION INFORMATION | DEALER INFORMATION | REGIONAL INFORMATION |
| --- | --- | --- |
| 3F08-0005 | 11234516 | JP |

FIG.10

URL REQUEST

```
GET /discov?service=appsdownload&device_id=3F08-00005&region_code=JP&dealer_code=11234516 HTTP/1.1
Host: www.example.com
```

FIG.11

RESPONSE

```
HTTP/1.1 200 OK
Content-Type: application/json; charset=UTF8

{
 "appsdownload" : "https://www.example.com/apps"
}
```

FIG.12

DISPLAY REQUEST https://hapi.start.***.com/v1/appsite/&device-id=3F08_00005®ion=JP&dealer=11234516

FIG. 13

```
HTTP/1.1 200 OK
Content-Type: application/json; charset=UTF-8
[
  {
    "appId": "S002",
    "appType": "install",
    "name": "OCR APP",
    "licenseKey": "",
    "description": "YOU CAN EXECUTE OCR FOR TEXT DOCUMENT",
    "version": "1.1",
    "icon": "http://www.example.com/apps/S002/icon.png",
    "licenseInfo": "http://www.example.com/apps/S002/license.html"
  },{
    "appId": "S003",
    "appType": "install",
    "name": "TRANSLATION APP",
    "licenseKey": "S003-555-666",
    "description": "YOU CAN TRANSLATE INTO FIVE LANGUAGES",
    "version": "2.2",
    "icon": "http://www.example.com/apps/S003/icon.png",
    "licenseinfo": "http://www.example.com/apps/S003/license.html"
  }
]
```

DISPLAY INFORMATION CORRESPONDING TO APPLICATION OF S002

DISPLAY INFORMATION CORRESPONDING TO APPLICATION OF S003

| DEVICE IDENTIFICATION INFORMATION | DEALER INFORMATION | REGIONAL INFORMATION | URL |
|---|---|---|---|
| 3F08-00005 | 11234516 | JP | http://xxx.co.jp |
| 4G12-00011 | 23456722 | US | http://yyy.co.jp |
| ⋮ | ⋮ | ⋮ | ⋮ |

FIG.22

| MODEL ID | DEVICE IDENTIFICATION INFORMATION (SERIAL NUMBER) |
|---|---|
| M001 | 3F08-00005 |
| M002 | 4G12-00011 |
| ⋮ | ⋮ |

FIG.23

| APPLICATION IDENTIFICATION INFORMATION | MODEL ID |
|---|---|
| S001 | M001<br>M002 |
| S002 | M001<br>M003 |
| S003 | M001<br>M003 |
| ⋮ | ⋮ |

FIG.24

| ORGANIZATION ID | REGIONAL INFORMATION | DEALER INFORMATION |
|---|---|---|
| O001 | - | - |
| O002 | JP | - |
| O003 | US | - |
| O004 | EU | - |
| O005 | JP | JA5 |
| O006 | JP | JB6 |
| O007 | US | UC7 |
| ⋮ | ⋮ | ⋮ |

FIG.25

| ORGANIZATION ID | APPLICATION IDENTIFICATION INFORMATION | AVAILABILITY INFORMATION |
|---|---|---|
| O001 | S001 | AVAILABLE |
| O002 | S002 | AVAILABLE |
| O003 | S003 | AVAILABLE |
| ⋮ | ⋮ | ⋮ |

FIG.26

| APPLICATION IDENTIFICATION INFORMATION | DISPLAY INFORMATION | | | |
|---|---|---|---|---|
| | LANGUAGE | DISPLAY NAME | DISPLAY NAME | IMAGE |
| S001 | JAPANESE | EASY COPIER | YOU CAN COPY EASILY | |
| S001 | ENGLISH | EASY COPIER | YOU CAN COPY EASILY | |
| S002 | JAPANESE | OCR APP | YOU CAN EXECUTE OCR FOR TEXT DOCUMENT | |
| S002 | FRENCH | OCR APP | VOUS POUVEZ EFFECTUER L'OCR POUR LES DOCUMENTS TEXTE | |
| S003 | JAPANESE | TRANSLATION APP | YOU CAN TRANSLATE INTO FIVE LANGUAGES | |
| ⋮ | ⋮ | ⋮ | ⋮ | ⋮ |

USER
1
MFP
BROWSER APPLICATION
INSTALLER
7
APPLICATION SERVER
CONFIRMATION BUTTON PRESSED
S21
INSTALLATION COMMAND
S22
APPLICATION REQUEST
S23
APPLICATION
S24
S25
(INSTALL)

FIG.31

| DEALER INFORMATION | URL |
|---|---|
| 11234516 | http://xxx.co.jp |
| 23456722 | http://yyy.co.jp |
| 33567833 | http://zzz.co.jp |
| ⋮ | ⋮ |

FIG.32

| DEVICE IDENTIFICATION INFORMATION | URL |
|---|---|
| 3F08-00005 | http://xxx.co.jp |
| 4G12-00011 | http://yyy.co.jp |
| ⋮ | ⋮ |

INFORMATION PROCESSING SYSTEM, INFORMATION PROCESSING APPARATUS, IMAGE FORMING APPARATUS, INFORMATION PROCESSING METHOD, AND COMPUTER PROGRAM PRODUCT

CROSS-REFERENCE TO RELATED APPLICATIONS

This application is a continuation application of U.S. application Ser. No. 15/451,790, filed on Mar. 7, 2017, which claims priority under 35 U.S.C. § 119 to Japanese Patent Application No. 2016-054416, filed on Mar. 17, 2016 and Japanese Patent Application No. 2016-197074, filed on Oct. 5, 2016, the entire contents of each of which are incorporated herein by reference herein.

BACKGROUND OF THE INVENTION

1. Field of the Invention

The present invention relates to an information processing system, an information processing apparatus, an image forming apparatus, an information processing method, and a program.

2. Description of the Related Art

In recent years, as various communication devices such as a mobile phone or a portable information terminal are widely spread, applications that can be used on communication devices have been actively developed.

For example, in Japanese Unexamined Patent Application Publication No. 2010-182309, a technique is disclosed, in which a server introduces an application, and the introduced application is selected in the device side, so that the selected application is downloaded.

However, the technique discussed in Japanese Unexamined Patent Application Publication No. 2010-182309 fails to consider a case where the application to be used for the device is different for each dealer that sells the device. For this reason, an application that is not allowed to use in the device may be erroneously introduced to the device. Therefore, it is difficult to introduce the application properly available to the device.

SUMMARY OF THE INVENTION

According to one aspect of the present invention, an information processing system includes one or more devices and an information processing apparatus connectable to the devices through a network. The information processing apparatus includes a screen information request receiver, an application identification information specifying unit, a screen information transmitter. The screen information request receiver receives, from the device, a screen information request used to request screen information for providing an application. The screen information includes at least dealer information representing a dealer that sells the device. The application identification information specifying unit specifies application identification information corresponding to the dealer information included in the screen information request based on application correspondence relation information representing a correspondence relation between the dealer information and the application identification information identifying an application available to the device. The screen information transmitter transmits, to the device, the screen information for providing the application identified by the application identification information specified by the application identification information specifying unit as a response to the screen information request received by the screen information request receiver. The device includes a screen information request transmitter, a screen information receiver, and a display control unit. The screen information request transmitter transmits the screen information request to the information processing apparatus. The screen information receiver receives the screen information from the information processing apparatus as a response to the screen information request. The display control unit performs control for displaying a screen based on the screen information received by the screen information receiver.

BRIEF DESCRIPTION OF THE DRAWINGS

FIG. 10 is a diagram illustrating an exemplary URL request;

FIG. 11 is a diagram illustrating an exemplary URL received as a response to the URL request;

FIG. 12 is a diagram illustrating an exemplary screen information request;

FIG. 13 is a diagram illustrating exemplary displayed information;

FIG. 22 is a diagram illustrating an exemplary device model ID table;

FIG. 23 is a diagram illustrating exemplary third correspondence relation information;

FIG. 24 is a diagram illustrating an exemplary organization ID table;

FIG. 25 is a diagram illustrating exemplary fourth correspondence relation information;

FIG. 26 is a diagram illustrating exemplary application detail information;

FIG. 31 is a diagram illustrating exemplary connection relation information according to a second embodiment; and FIG. 32 is a diagram illustrating exemplary connection relation information according to a third embodiment.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
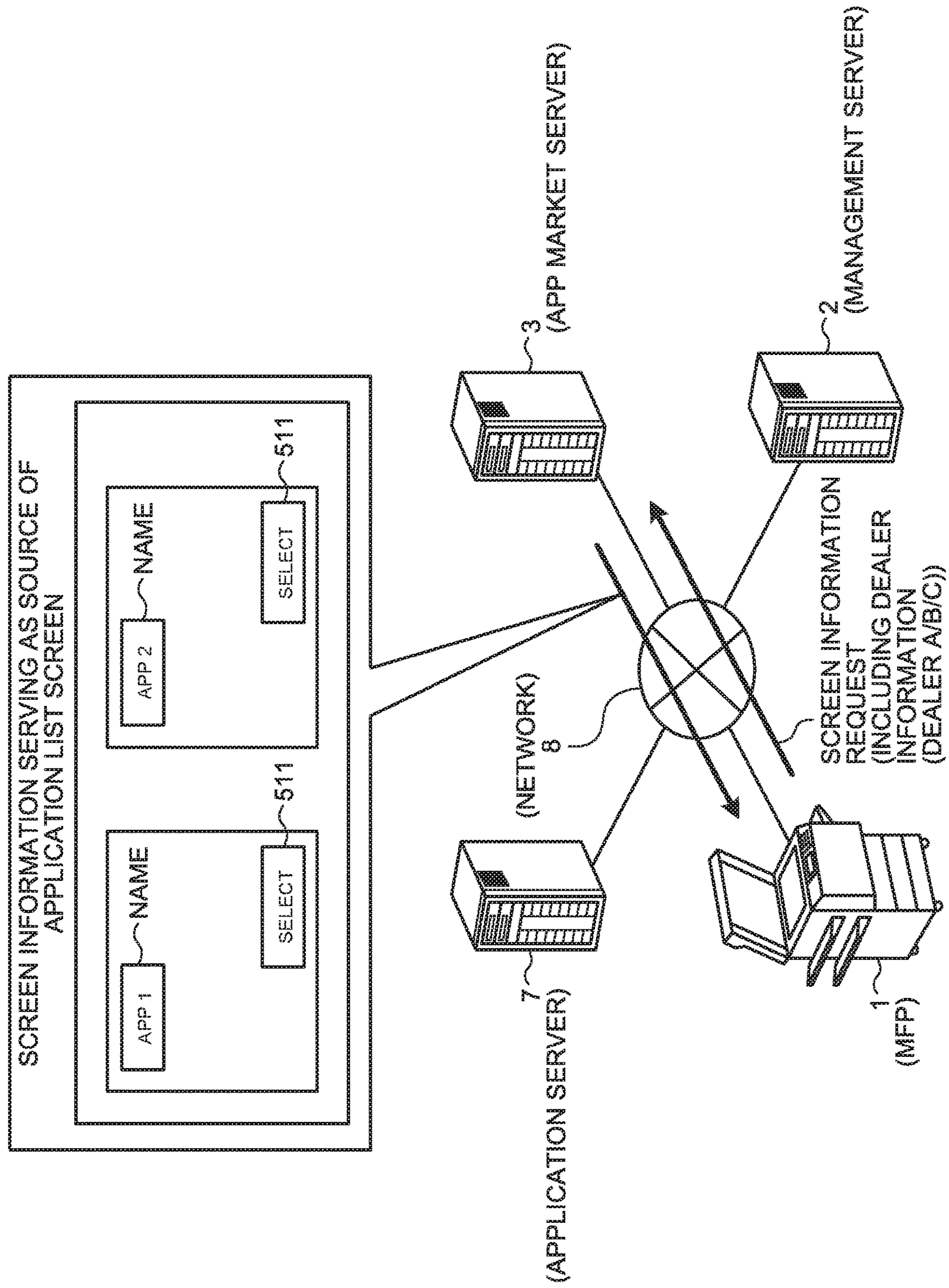
FIG. 1 is a diagram illustrating an exemplary configuration of an information processing system.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An object of an embodiment is to provide an information processing system, an information processing apparatus, an image forming apparatus, an information processing method, and a program capable of introducing an application properly available to the device.

An information processing system, an information processing apparatus, an image forming apparatus, an information processing method, and a program according to embodiments will now be described in details with reference to the accompanying drawings. In the following description, a multifunction peripheral (MFP) will be described as an example of the image forming apparatus. Note that the device included in the information processing system is not limited to the image forming apparatus, and may include other devices such as a camera, a projector, an interactive whiteboard (electronic blackboard), a terminal dedicated to a TV conference/Web conference system, a digital signage, a production printer, a 3D printer, and a facsimile. Note that the MFP is a device having a plurality of different functions such as a copier function, a scanner function, a printer function, and a facsimile function.

First Embodiment

FIG. 1 is a diagram schematically illustrating an exemplary configuration of the information processing system 100 according to the embodiment. As illustrated in FIG. 1, the information processing system 100 includes an MFP 1, a management server 2, an app market server 3, and an application server 7 connected to each other through a network 8.

The management server 2 manages a uniform resource locator (URL) for specifying the app market server 3 serving as a communication destination of the MFP 1. The management server 2 receives a URL request from the MFP 1 and transmits a URL corresponding to the received URL request to the MFP 1 as a response. A specific configuration of the management server 2 will be described below in more details. Note that, although the URL is exemplified as specification information for specifying the app market server 3, the specification information is not limited thereto. For example, the specification information may include an Internet protocol (IP) address, a domain name, and the like. The IP address is a code for determining a device that transmits or receives packets in the IP. The domain name is a part of the name for identifying an individual computer (device) in the IP network. Typically, the domain name is registered on the computer network in combination with the IP address. The specification information may be the IP address, the domain name, or a combination thereof. That is, the specification information may be at least one of the IP address and the domain name.

The app market server 3 is an example of the "information processing apparatus" and transmits screen information for each application available to the MFP 1, such as a user policy of the application or a Web page for downloading the application. In other words, the app market server 3 transmits, to the MFP 1, screen information serving as a source of the Web page for providing an application available to the MFP 1. Although it will be described below in more details, as the screen information request is received from the MFP 1, the app market server 3 specifies one or more applications available to the MFP 1 based on dealer information contained in the received screen information request (information representing a dealer who sells the MFP 1). In addition, screen information for providing one or more applications thus specified is provided as a response to the screen information request.

In this example, it is assumed that the following application and software are installed in the MFP 1 in advance: an application (in the following description, referred to as an "app market application") for obtaining the URL from the management server 2, obtaining the screen information from the app market server 3 corresponding to the obtained URL, creating a screen based on this obtained screen information (in the following description, referred to as an "application list screen"), and displaying the screen in the MFP 1; and software for providing a function of controlling installation of the application selected by a user out of the applications displayed on the application list screen in the MFP 1 (hereinafter, simply referred to as an "installer"). In this example, the function of the app market application is implemented using an application for providing a Web browser function (hereinafter, simply referred to as a "browser application"). In this example, the browser application is also installed in the MFP 1 in advance. The MFP 1 will be described below in more details.

The application server 7 stores a plurality of applications and transmits a target application to the MFP 1 in response to a request from the MFP 1.

For simplicity purposes, a single MFP 1 is illustrated as a device included in the information processing system 100 in FIG. 1. However, without limiting thereto, the number of the devices included in the information processing system 100 or their types may be selected arbitrarily. Similarly, the number of the app market servers 3 included in the information processing system 100 may be selected arbitrarily.

For example, one or more app market servers 3 may be provided for each country or for each province.

Figure 2:
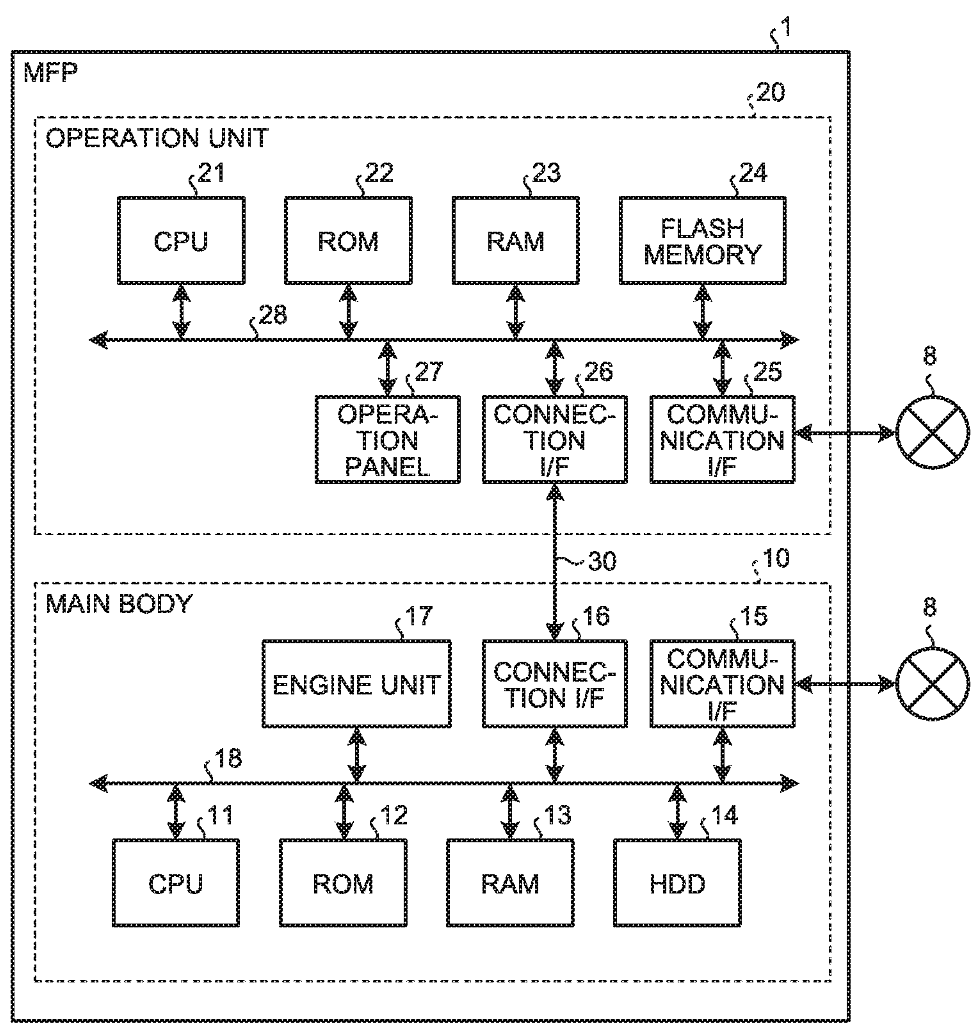
FIG. 2 is a diagram illustrating an exemplary hardware configuration of an MFP.

Next, a hardware configuration of the MFP 1 will be described with reference to FIG. 2. As illustrated in FIG. 2, the MFP 1 includes a main body 10 capable of implementing various functions such as a copier function, a scanner function, a facsimile function, and a printer function, and an operation unit 20 for receiving a user's operation. Note that "a user's operation is received" also means that "information input according to the user's operation is received (including a signal representing a coordinate value on the screen)." The main body 10 and the operation unit 20 are communicably connected to each other through a dedicated communication path 30. The communication path 30 may comply with, for example, a universal serial bus (USB) standard or any other standard regardless of a wired or wireless manner. The main body 10 has at least a plotter or a scanner. In addition, the operation unit 20 performs transmission of the screen information request and reception of the screen information and has an app market application (corresponding to a "list display application") capable of displaying applications that the MFP 1 can provide as a list.

The main body 10 can perform an operation corresponding to an operation received through the operation unit 20. In addition, the main body 10 is communicable with an external device such as a client personal computer (PC) and performs an operation corresponding to an instruction received from an external device.

First, a hardware configuration of the main body 10 will be described. As illustrated in FIG. 2, the main body 10 includes a central processing unit (CPU) 11, a read only memory (ROM) 12, a random access memory (RAM) 13, a hard disk drive (HDD) 14, a communication interface (I/F) 15, a connection I/F 16, and an engine unit 17 connected to each other through a system bus 18.

The CPU 11 generally controls the operations of the main body 10. The CPU 11 controls operations of the entire main body 10 by executing a program stored in the ROM 12 or the HDD 14 by using the RAM 13 as a work area to implement various functions such as a copier function, a scanner function, a facsimile function, and a printer function as described above.

The communication I/F 15 is an interface for communication with the network 8. The connection I/F 16 is an interface for communicating with the operation unit 20 through the communication path 30.

The engine unit 17 is hardware for performing processes other than generic information processing and communication process for implementing a copier function, a scanner function, a facsimile function, and a printer function. For example, the engine unit 17 has a scanner (image reader) for scanning and reading an original image, a plotter (image forming unit) for printing data on a sheet material such as paper, a facsimile unit for performing facsimile communication, and the like. The engine unit 17 may further have a particular optional function such as a finisher for sorting the printed sheets or an automatic document feeder (ADF) for automatically feeding original documents.

Next, a hardware configuration of the operation unit 20 will be described. As illustrated in FIG. 2, the operation unit 20 includes a CPU 21, a ROM 22, a RAM 23, a flash memory 24, a communication I/F 25, a connection I/F 26, and an operation panel 27 connected to each other through a system bus 28.

The CPU 21 generally controls operations of the operation unit 20. The CPU 21 controls the operations of the entire operation unit 20 by executing a program stored in the ROM 22 or the flash memory 24 by using the RAM 23 as a work area to implement various functions described below such as a display function for displaying information (image) corresponding to the input received from a user.

The communication I/F 25 is an interface for connection to the network 8. The connection I/F 26 is an interface for communication with the main body 10 through the communication path 30.

The operation panel 27 receives various types of inputs corresponding to a user's operation and displays various types of information (such as information corresponding to the received operation, information representing an operation status of the MFP 1, and information representing a setting state). In this example, the operation panel 27 is a liquid crystal display (LCD) provided with a touch panel function, but not limited thereto. For example, the operation panel 27 may be an organic electroluminescent (EL) display device provided with a touch panel function. In addition to or instead of such devices, an operation unit such as a hardware key or a display unit such as a lamp may also be provided.

Figure 3:
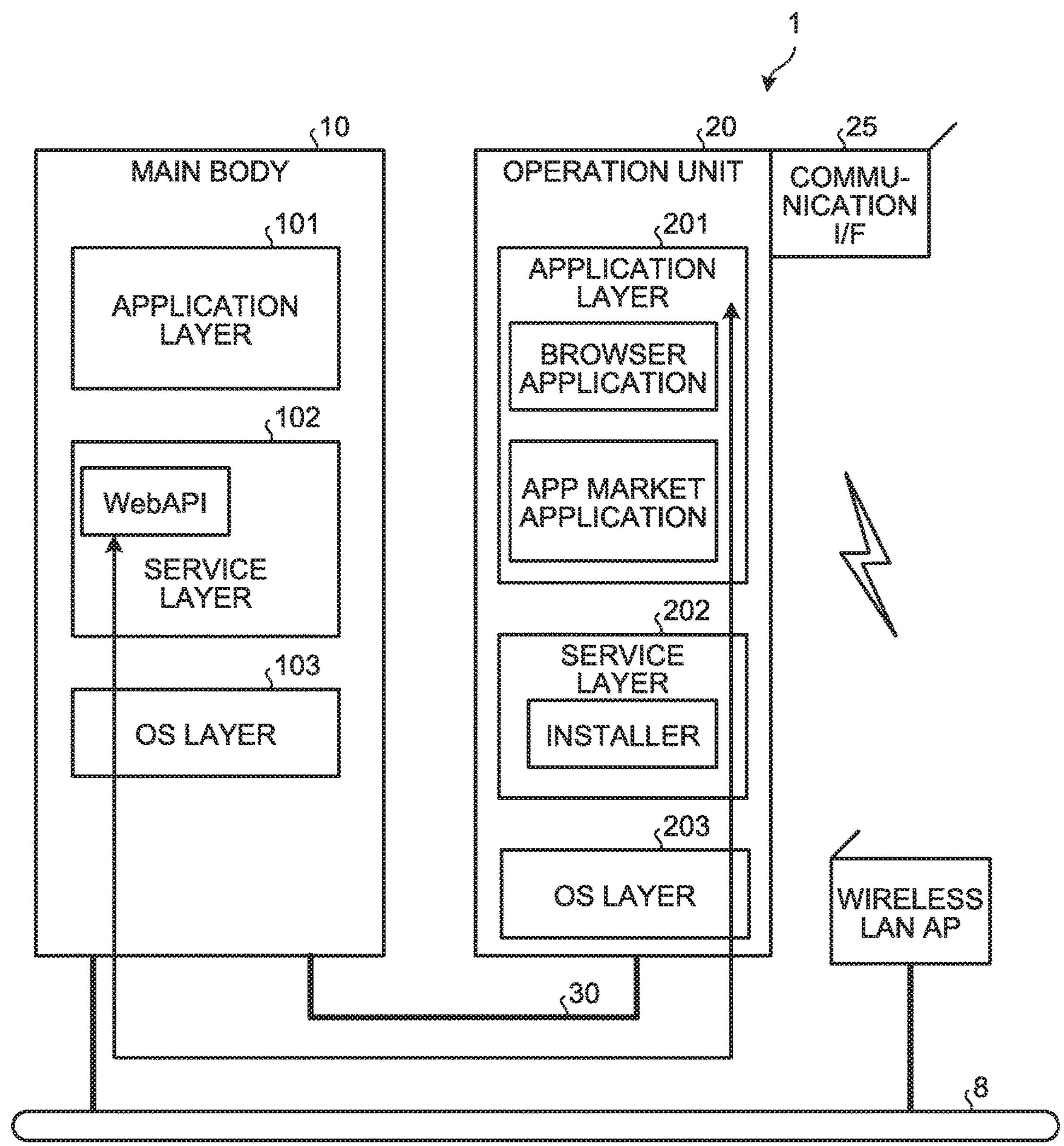
FIG. 3 is a diagram illustrating an exemplary software configuration of the MFP.

Next, a software configuration of the MFP 1 will be described. FIG. 3 is a schematic diagram illustrating an exemplary software configuration of the MFP 1. As illustrated in FIG. 3, the main body 10 includes an application layer 101, a service layer 102, and an operating system (OS) layer 103. Entities of the application layer 101, the service layer 102, and the OS layer 103 are various software programs stored in the ROM 12 or the HDD 14. Various functions are provided when the CPU 11 executes such programs.

The software of the application layer 101 is application software (in the following description, simply referred to as an "app") for providing a predetermined function by operating hardware resources. For example, the app may include a copier app for providing a copier function, a scanner app for providing a scanner function, a FAX app for providing a FAX function, a printer app for providing a printer function, and the like.

The software of the service layer 102 is software interposed between the application layer 101 and the OS layer 103 to provide an interface for using hardware resources of the main body 10 to the app. More specifically, the software of the service layer 102 includes software for receiving an operation request for the hardware resources and providing a function for controlling an operation request. The operation request received by the service layer 102 may include a scanner reading request, a plotter print request, and the like.

Note that the interface function of the service layer 102 is provided to the application layer 201 of the operation unit 20 as well as the application layer 101 of the main body 10. That is, the application layer 201 (app) of the operation unit 20 can also implement the function of the hardware resource (such as the engine unit 17) of the main body 10 using the interface function of the service layer 102. For example, the interface function of the service layer 102 is provided using the Web API. The operation unit 20 and the main body 10 can communicate with each other through a network such as the communication path 30.

The software of the OS layer 103 is basic software (operating system (OS)) for providing a basic function for controlling hardware of the main body 10. The software of the service layer 102 converts a hardware resource use request from various apps into a command analyzable by the OS layer 103 and transmits it to the OS layer 103. In addition, as the command is executed by the software of the OS layer 103, the hardware resource performs the operation corresponding to the request from the app.

Similarly, the operation unit 20 has an application layer 201, a service layer 202, and an OS layer 203. The application layer 201, the service layer 202, and the OS layer 203 of the operation unit 20 have the same hierarchical structure as that of the main body 10. However, a function provided by the app of the application layer 201 or an operation request type receivable by the service layer 202 is different from those of the main body 10. According to the embodiment, the software of the service layer 202 includes an installer and the like. The app of the application layer 201 may be software for providing a predetermined function by operating hardware resources of the operation unit 20. However, the app of the application layer 201 is typical software for providing user interface (UI) function for performing operation and display with respect to the functions of the main body 10 (such as a copier function, a scanner function, a FAX function, and a printer function). The app of the application layer 201 includes a browser application, an app market application, and the like.

Note that, according to the embodiment, for keeping independency of the function, the software of the OS layer 103 of the main body 10 is different from that of the OS layer 203 of the operation unit 20. That is, the main body 10 and the operation unit 20 are operated independently using different operating systems. For example, the NetBSD (registered trademark) may be employed as the software of the OS layer 103 of the main body 10, and the Android (registered trademark) may be employed as the software of the OS layer 203 of the operation unit 20.

As described above, in the MFP 1 according to the embodiment, the main body 10 and the operation unit 20 are operated in different operating systems. Therefore, communication between the main body 10 and the operation unit 20 is performed as communication between different devices instead of communication between processes in a common device. Such an operation (command communication) includes an operation for transmitting the information received by the operation unit 20 (instruction from a user) to the main body 10 or an operation for notifying the operation unit 20 of an event from the main body 10. Here, the function of the main body 10 may be implemented by performing command communication from the operation unit 20 to the main body 10. In addition, the event notified of from the main body 10 to the operation unit 20 may include an execution status of the operation in the main body 10, a setting in the main body 10, and the like.

According to the embodiment, power is supplied to the operation unit 20 from the main body 10 through the communication path 30. Therefore, the power control of the operation unit 20 may be performed separately (independently) from the power control of the main body 10.

Figure 4:
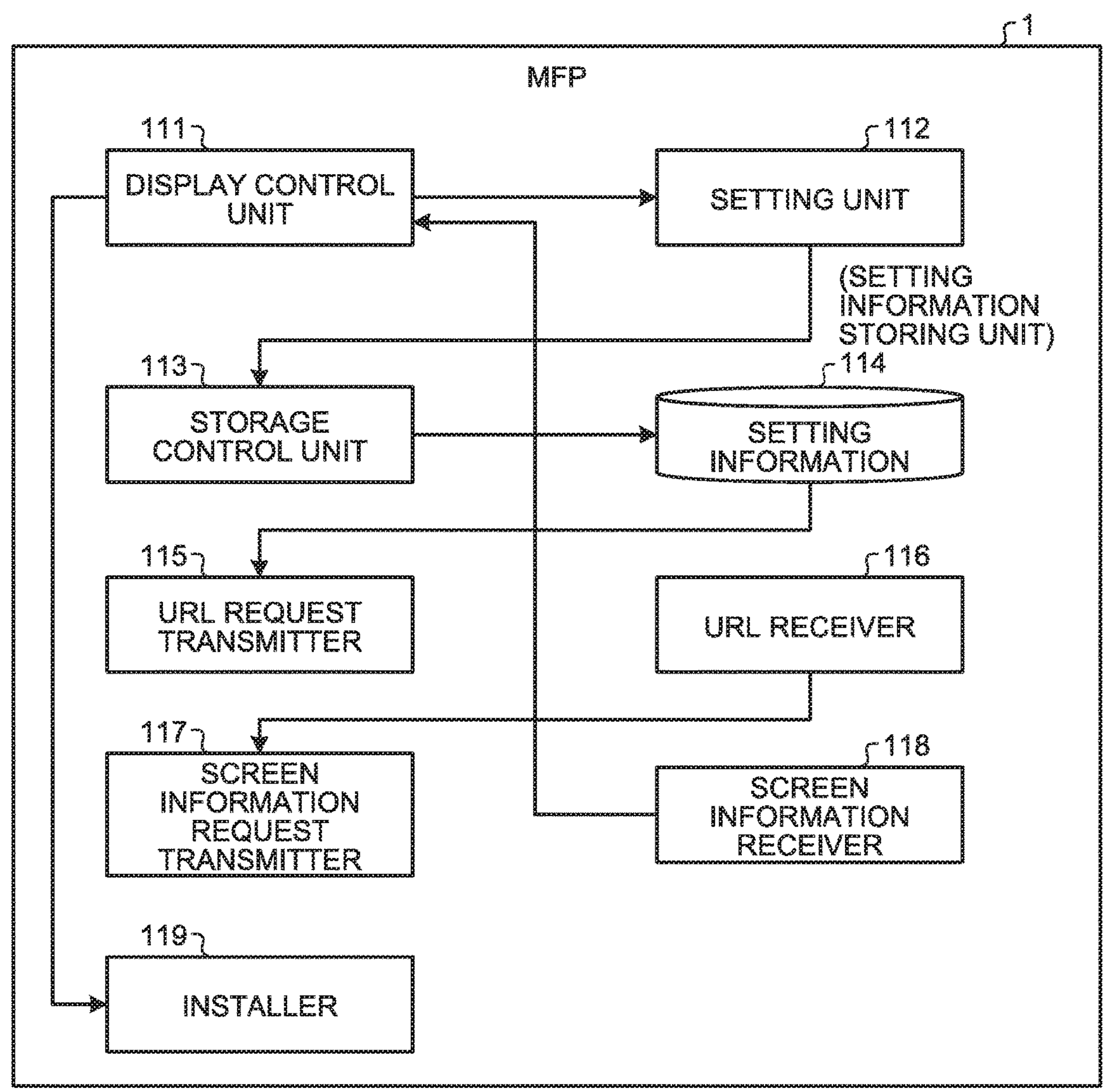
FIG. 4 is a diagram illustrating an exemplary function of the MFP.

Next, the functions of the MFP 1 will be described. FIG. 4 is a block diagram illustrating exemplary functions of the MFP 1. As illustrated in FIG. 4, the MFP 1 includes a display control unit 111, a setting unit 112, a storage control unit 113, a setting information storing unit 114, an URL request transmitter 115, an URL receiver 116, a screen information request transmitter 117, a screen information receiver 118, and an installer 119. Although FIG. 4 mainly illustrates the functions according to the embodiment for simplicity purposes, other functions of the MFP 1 may also be included without limiting thereto.

The display control unit 111 performs control for displaying various screens on the operation panel 27 (display unit). The display control unit 111 according to the embodiment performs control for displaying an operational screen for allowing various operations on the operation panel 27. In addition, the display control unit 111 according to the embodiment also performs control for displaying the application list screen on the operation panel 27. A specific example of the application list screen will be described below.

Figure 5:
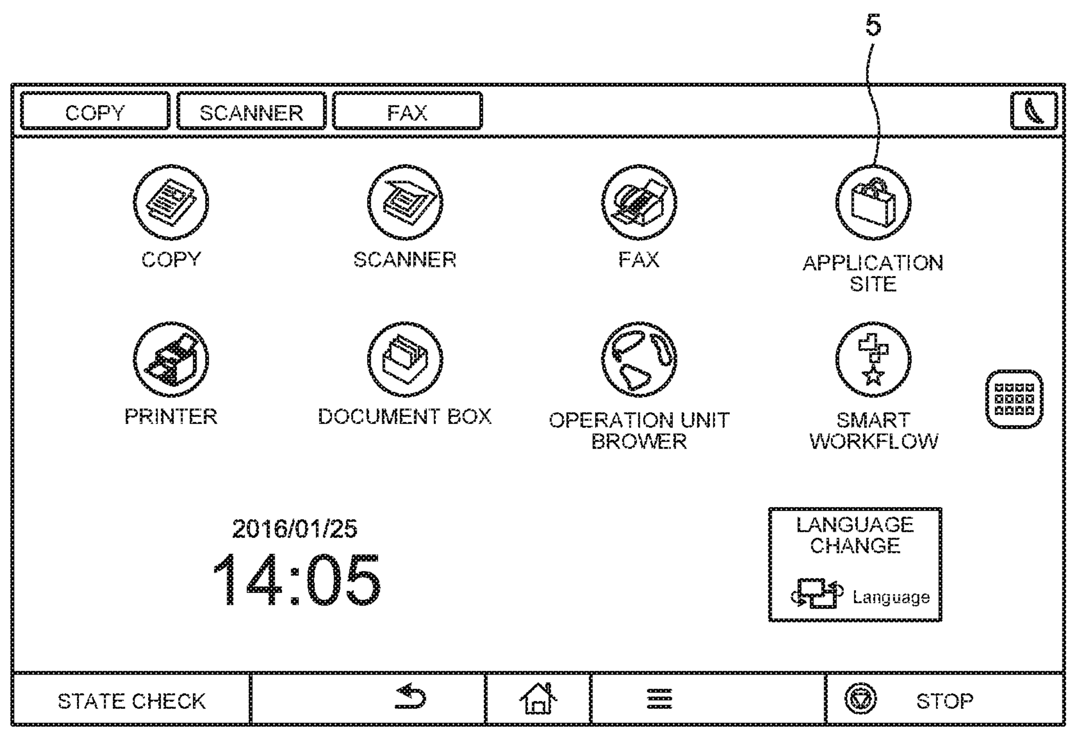
FIG. 5 is a diagram illustrating an exemplary operational screen.
Figure 6:
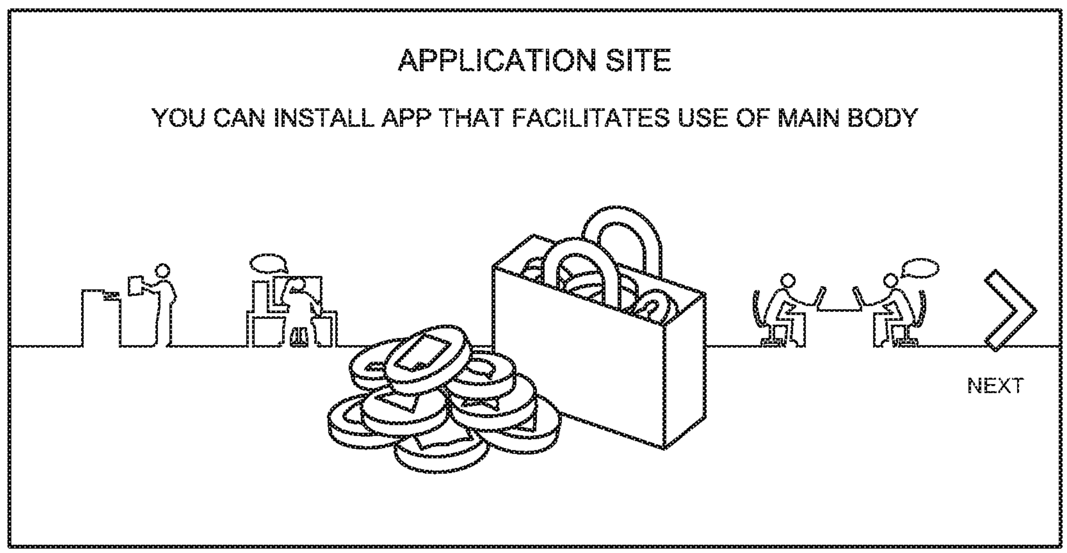
FIG. 6 is a diagram illustrating an exemplary initial screen.
Figure 7:
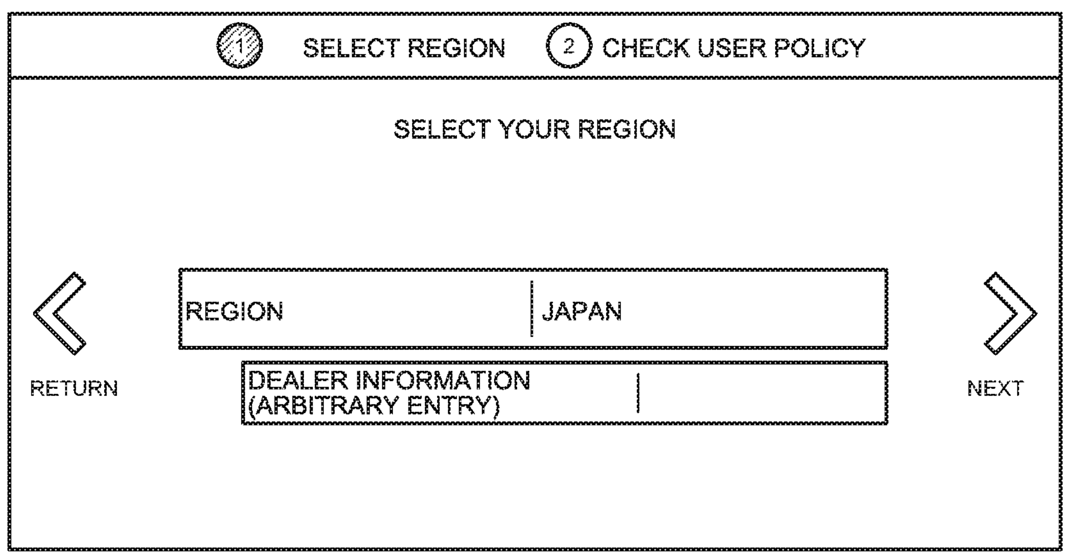
FIG. 7 is a diagram illustrating an exemplary input screen.
Figures 8, 9:
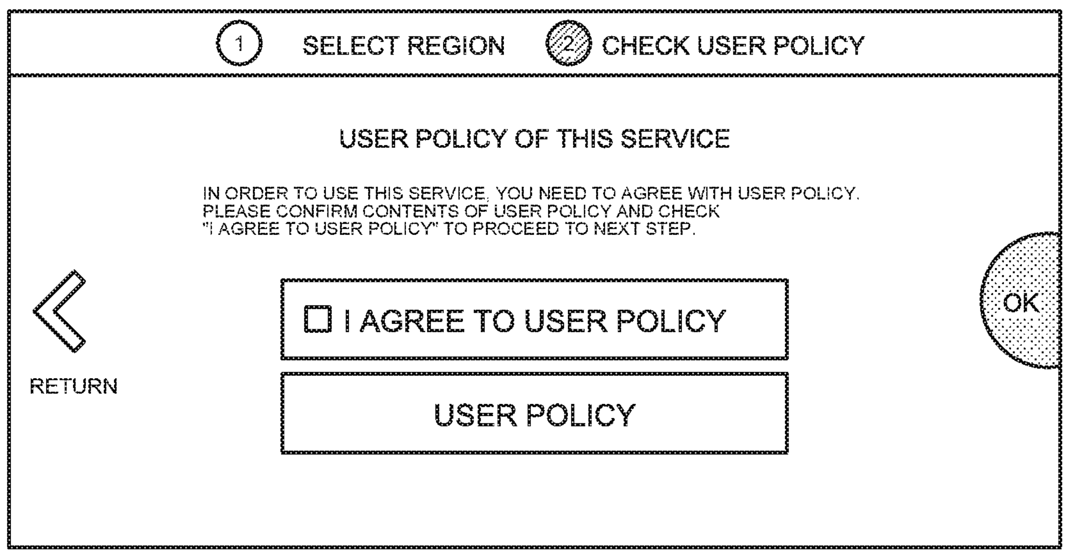
FIG. 8 is a diagram illustrating an exemplary confirmation screen.
FIG. 9 is a diagram illustrating exemplary information stored in a setting information storing unit.

FIG. 5 is a diagram illustrating an exemplary operational screen. On this operational screen, an icon 5 for activating the app market application is displayed. Here, an operation example when the app market application is initially activated will be described. In this example, when a user touches the icon 5, the app market application is activated, and the initial screen as illustrated in FIG. 6 is displayed on the operation panel 27. If an operation of pressing a display element (UI) representing an arrow above the "NEXT" is received, an input screen used for inputting regional information representing a region where the MFP 1 is used (although a region where the MFP 1 is sold is assumed in this example, a region where the MFP 1 is leased or rented may also be possible without a particular limitation) or dealer information regarding a dealer that sells the MFP 1 is displayed on the operation panel 27, as illustrated in FIG. 7. Settings corresponding to various inputs are stored as described later. Then, if an operation of pressing a display element (UI) representing an arrow above the "NEXT" on this input screen is received, a confirmation screen for prompting confirmation of a user policy (a policy for providing a user with the screen information) is displayed on the operation panel 27 as illustrated in FIG. 8. On this confirmation screen, if an operation of selecting an item "I AGREE TO USER POLICY" is received, and an operation of pressing a display element (UI) representing "OK" is received, the app market application performs control for transmitting a URL request described later to the management server 2 using the stored setting. The subsequent operations will be described later in more details. Note that when the app market application is activated in the second and sequent times, the screens illustrated in FIGS. 6 to 8 are not displayed, and the activated app market application performs a process of transmitting the URL request, which will be described later, to the management server 2 using the stored setting. Here, the app market application (corresponding to the "list display application") receives an input of the dealer information at least at the time of an initial activation and adds the input dealer information to the screen information request described later. The screen information request will be described below in more details.

Returning to FIG. 4, the setting unit 112 sets the dealer information representing a dealer that sells the MFP 1 or the regional information representing a region where the MFP 1 is used according to the input for instructing the dealer information or the regional information. In this example, the setting unit 112 may set the dealer information or the regional information in accordance with the input through the input screen described above.

The storage control unit 113 performs control for storing the dealer information or the regional information set by the setting unit 112. In this example, the storage control unit 113 performs control for storing the dealer information or the regional information set by the setting unit 112 in the setting information storing unit 114 as setting information. The setting information storing unit 114 may also store device identification information (serial number) for uniquely identifying the MFP 1. FIG. 9 is a diagram illustrating exemplary information stored in the setting information storing unit 114 (referred to as "setting information"). In this example, the setting information storing unit 114 stores setting information including the device identification information, the dealer information, and the regional information. In this example, the device identification information is represented with nine digit characters, including upper four digit characters used to identify a device model (device model information) and lower five digit characters indicating a unique code allocated to the device. Such a combination forms information for uniquely identifying the device (device identification information). In addition, in the example of FIG. 9, the dealer information is represented with eight digit characters in which the leftmost character indicates a region. For example, the numeral "1" denotes "Japan," the numeral "2" denotes "Unite States of America," the numeral "3" denotes "Europe," and the numeral "4" denotes "Asia." The second to sixth characters from the left indicate information for identifying a dealer (seller). The seventh to eighth characters from the left indicate a code for detecting an input error (checksum). Note that encryption may be employed for the entire information. The regional information is information representing a region where the MFP 1 is used, and the abbreviation "JP" denotes "Japan."

The URL request transmitter (specification information request transmitter) 115 transmits, to the management server 2, a URL request (specification information request) for requesting a URL (specification information) for specifying the app market server 3 serving as a communication destination. The URL request contains at least one of the dealer information, the regional information, and the device information. In this example, the URL request transmitter 115 transmits, to the management server, a URL request for requesting a URL of the app market server 3 containing the device identification information stored in the setting information storing unit 114 (as an example of the device information for specifying the device), the regional information, and the dealer information. However, the present invention is not limited thereto. Depending on the access information managed by the management server 2, for example, the URL request may contain any one of the dealer information, the regional information, and the device identification information or may contain two or more of them. FIG. 10 is a diagram illustrating an exemplary URL request. The parameter "device id" in the URL request of FIG. 10 indicates the device identification information, and the parameter "region_code" indicates the regional information. In addition, the parameter "dealer_code" indicates dealer information. The description "parameter name=value" following the question mark "?" and the subsequent mark "&" is based on a standard parameter description format called "QUERY parameter." In addition, "Host:www.example.com" indicates an exemplary host name stored in the memory unit (such as the flash memory 24) for accessing as a default.

The URL receiver 116 obtains the URL from the management server 2 as a response to the URL request described above. FIG. 11 is a diagram illustrating an exemplary URL of the app market server 3 received as a response to the URL request.

Figure 12:
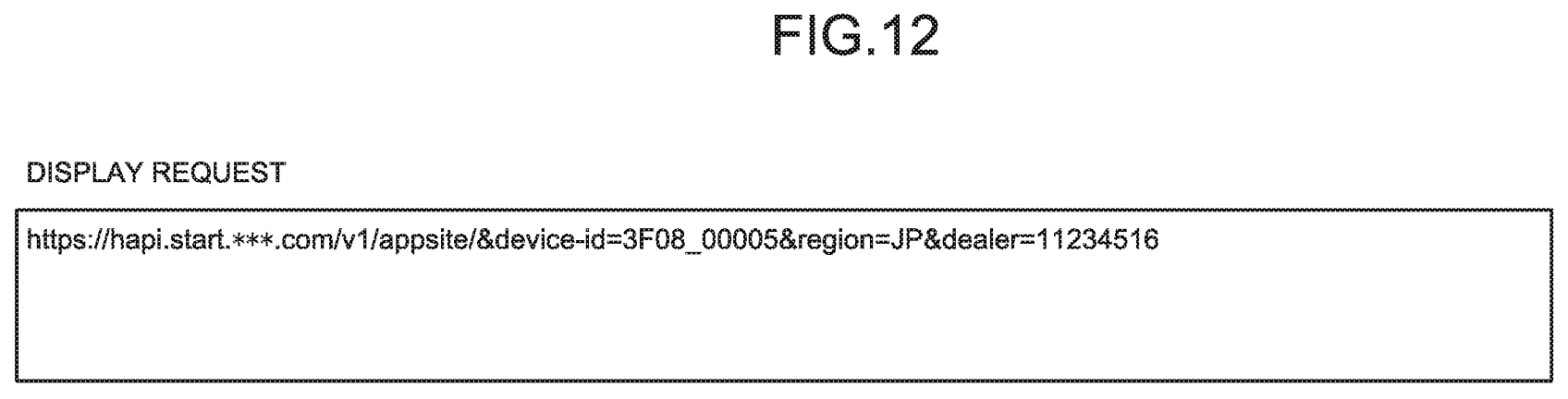

The screen information request transmitter 117 transmits a screen information request to the app market server 3. The screen information contains at least the dealer information described above and is used to request screen information for providing an application. More specifically, the screen information request transmitter 117 transmits the aforementioned screen information request to the app market server 3 specified by the URL received by the URL receiver 116. For example, the screen information request transmitter 117 may access the app market server 3 using the HTTP redirect. That is, if the URL received by the URL receiver 116 is changed, the app market server 3 returns a response containing the changed URL to the MFP 1, and thus, the MFP 1 (screen information request transmitter 117) can access the app market server 3 using the URL described in this response. In this example, the screen information request further contains the device information for specifying the MFP 1 and the regional information indicating the region where the MFP 1 is used. FIG. 12 is a diagram illustrating an exemplary screen information request. In this example, the device information is the device identification information (serial number) described above.

The screen information receiver 118 receives screen information for providing an application specified by the dealer information contained in the screen information request from the app market server 3 as a response to the screen information request. A method of specifying the application using the dealer information contained in the screen information request will become apparent by reading the description regarding the app market server 3 described below. In this example, the screen information receiver 118 receives screen information serving as a source of the application list screen, such as display information for each application available to the MFP 1 (including description information such as an introduction message), various commands such as an installation command, and layout information representing a layout of various display elements, as a response to the screen information request. FIG. 13 is a diagram illustrating exemplary display information received by the screen information receiver 118.

The display control unit 111 performs control for displaying a screen (application list screen) based on the screen information received by the screen information receiver 118 on the operation panel 27. In this example, the display control unit 111 creates the application list screen based on the screen information received by the screen information receiver 118 and performs control for displaying the created application list screen on the operation panel 27.

Figure 14:
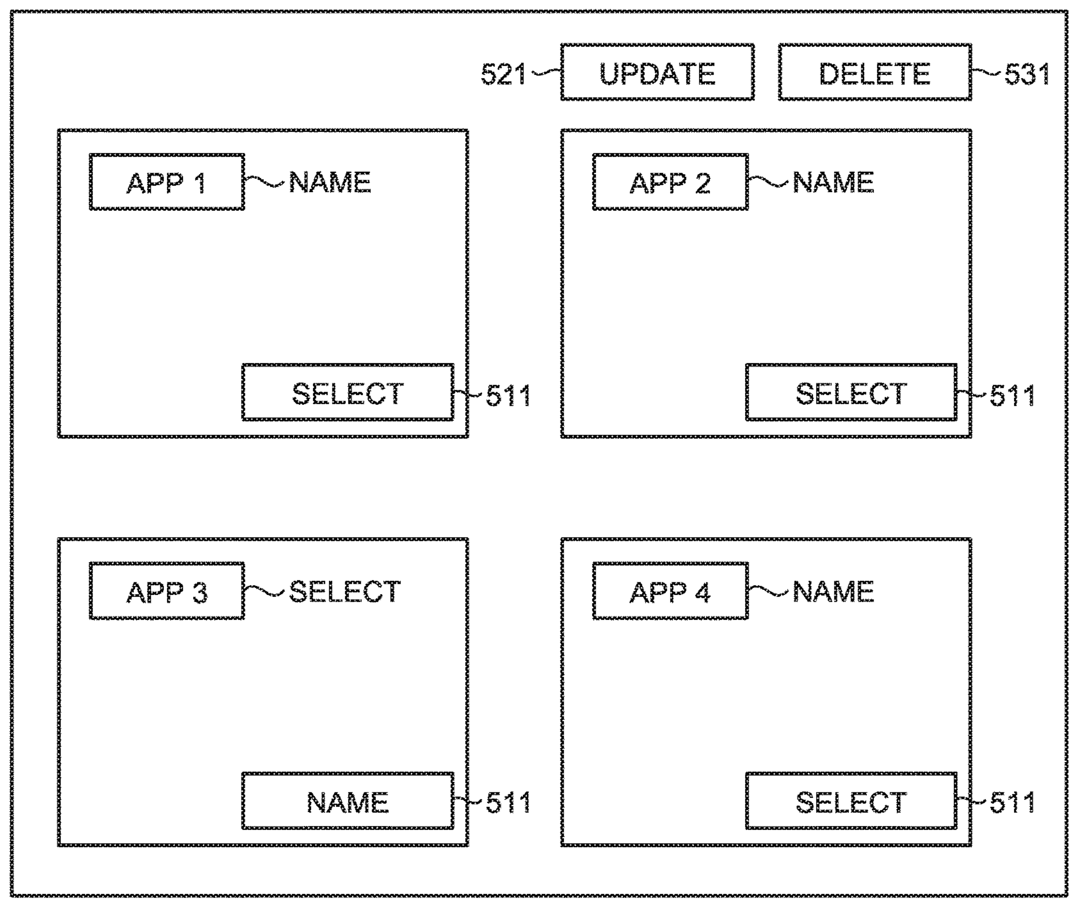
FIG. 14 is a diagram illustrating an exemplary application list screen.

FIG. 14 is a diagram illustrating an exemplary application list screen. In the example of FIG. 14, at least a name of the application and an application selection button 511 for selecting the application are displayed on the application list screen for each application available to the MFP 1. In addition, in the example of FIG. 14, an update selection button 521 for selecting an update of the application and a deletion selection button 531 for selecting deletion of the application is displayed on the application list screen.

Figure 15:
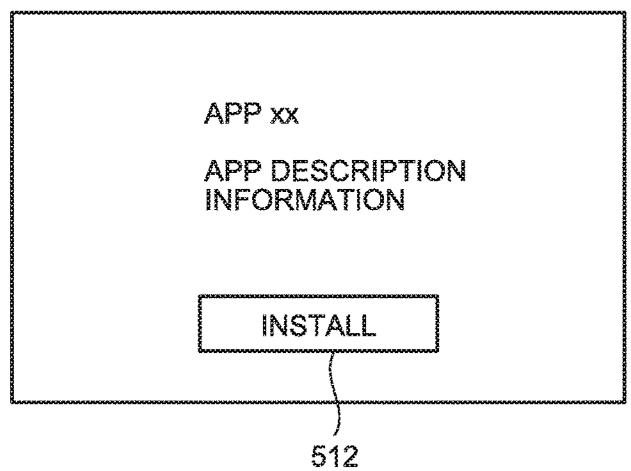
FIG. 15 is a diagram illustrating an exemplary installation instruction screen.

If pressing of any one of the application selection buttons 511 is received, the display control unit 111 performs control for displaying the installation instruction screen for displaying detailed contents of the corresponding application and receiving an installation execution instruction on the operation panel 27. FIG. 15 is a diagram illustrating an exemplary installation instruction screen. In the example of FIG. 15, the installation instruction screen displays app description information of the corresponding application and the installation button 512 for instructing execution of installation. In this example, pressing of the installation button 512 means selection of the installation command.

Figure 16:
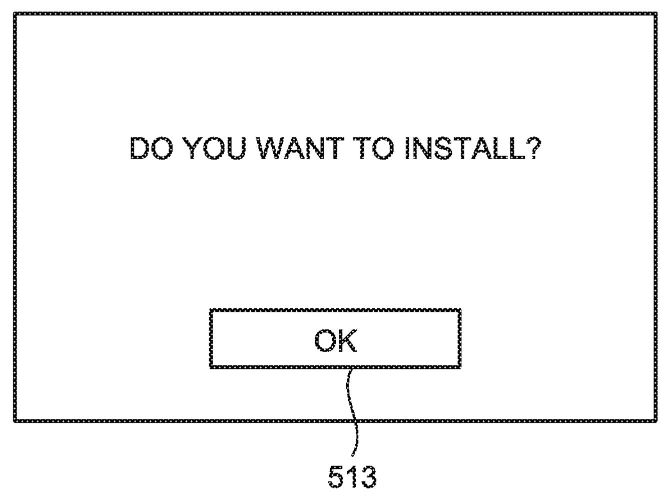
FIG. 16 is a diagram illustrating an exemplary installation confirmation screen.

In this example, if pressing of the installation button 512 is received, the display control unit 111 performs control for displaying an installation confirmation screen for finally confirming execution of installation on the operation panel 27. FIG. 16 is a diagram illustrating an exemplary installation confirmation screen. In the example of FIG. 16, the installation confirmation screen displays a confirmation button 513 for instructing that execution of installation is finally confirmed. In this example, the installation command is attached to the confirmation button 513 in a JavaScript (registered trademark) format. If pressing of the confirmation button 513 is received, the display control unit 111 notifies the installer 119 of the installation command attached to the pressed confirmation button 513. In addition, the installer 119 executes this installation command.

The functions of each element of the MFP 1 described above (including the display control unit 111, the setting unit 112, the storage control unit 113, the URL request transmitter 115, the URL receiver 116, the screen information request transmitter 117, the screen information receiver 118, and the installer 119) are implemented when the CPU (11 or 21) executes a program stored in a memory device (such as the ROM 12, the HDD 14, the ROM 22, and the flash memory 24). Alternatively, without limiting thereto, for example, at least a part of the functions of each element of the MFP 1 may be implemented using a dedicated hardware circuit (such as a semiconductor integrated circuit). In addition, the setting information storing unit 114 described above may be implemented, for example, using the HDD 14 of the main body 10 or using the flash memory 24 of the operation unit 20. Note that, in this example, the aforementioned functions of the URL request transmitter 115, the URL receiver 116, the screen information request transmitter 117, and the screen information receiver 118 are implemented by combining the CPU 21 and the communication I/F 25.

Figure 17:
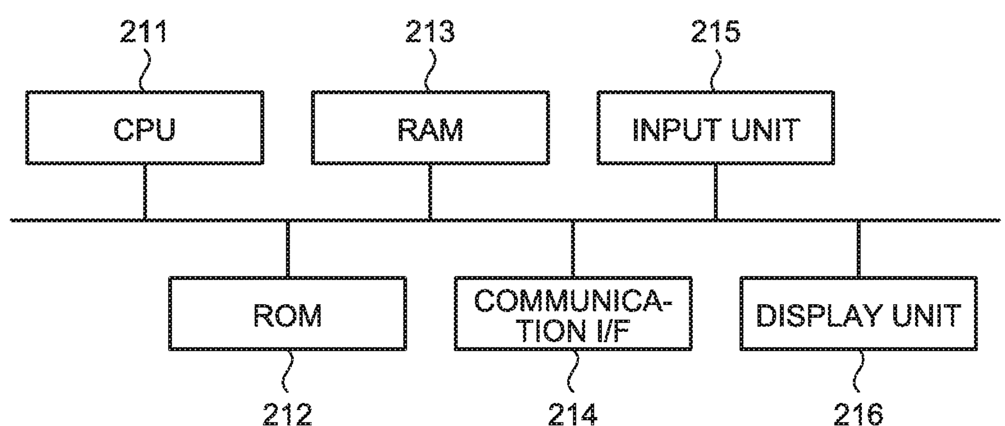
FIG. 17 is a diagram illustrating an exemplary hardware configuration of a management server.

Next, a configuration of the management server 2 will be described. FIG. 17 is a diagram illustrating an exemplary hardware configuration of the management server 2. As illustrated in FIG. 17, the management server 2 has a CPU 211, a ROM 212, a RAM 213, a communication I/F 214, an input unit 215, and a display unit 216. Note that, although a minimum configuration according to the embodiment is illustrated here, a hardware configuration of the management server 2 is not limited thereto. The CPU 211 generally controls the operations of the management server 2. The ROM 212 is a nonvolatile memory that stores various data such as a program. The RAM 213 is a volatile memory serving as a work area of various processes executed by the CPU 211. The communication I/F 214 is an interface for communication with the network 8. The input unit 215 is a device used to input a user's operation and includes, for example, a mouse or a keyboard. The display unit 216 is a device for displaying various types of information and may include, for example, a liquid crystal display device or the like.

Figures 18, 19:
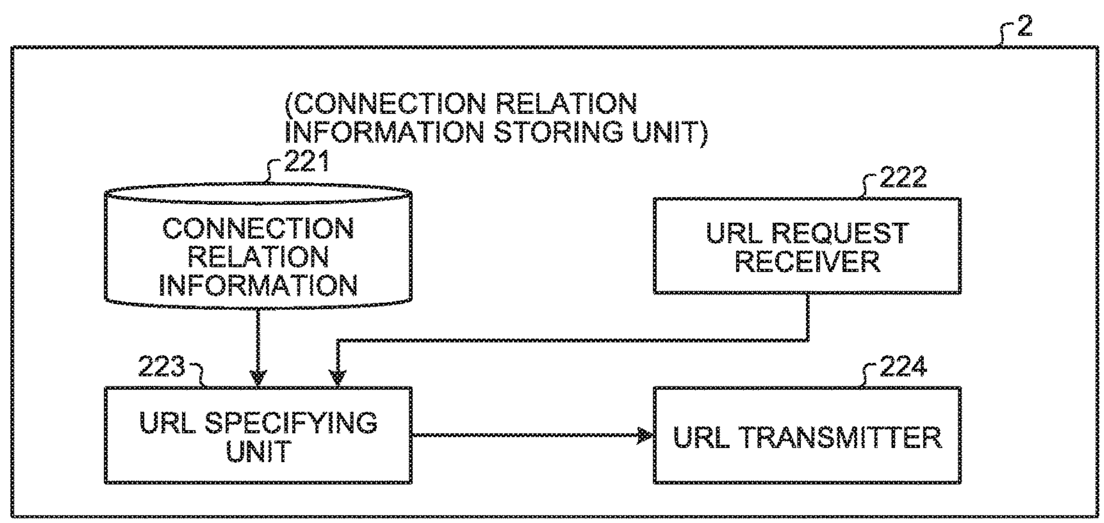
FIG. 18 is a diagram illustrating an exemplary function of the management server.
FIG. 19 is a diagram illustrating exemplary connection relation information.

FIG. 18 is a diagram illustrating an exemplary function of the management server 2. As illustrated in FIG. 18, the management server 2 has a connection relation information storing unit 221, a URL request receiver 222, a URL specifying unit 223, and a URL transmitter 224. For simplicity purposes, FIG. 18 mainly illustrates the function according to the embodiment. However, the functions of the management server 2 are not limited thereto.

The connection relation information storing unit 221 stores connection relation information representing a correspondence relation between a URL for specifying the app market server 3 serving as a communication destination of the MFP 1 and at least one of the dealer information, the regional information, and the device information. According to the embodiment, the connection relation information storing unit 221 stores the connection relation information in which each combination of the device identification information, the dealer information, and the regional information is associated with the URL (the URL that specifies a location of the corresponding app market server 3 in the network 8). FIG. 19 is a diagram illustrating exemplary connection relation information according to the embodiment.

FIG. 18 will be described continuously. The URL request receiver 222 is an example of the "specification information request receiver" and receives the URL request described above from the MFP 1. The URL specifying unit 223 is an example of the "specification information specifying unit" and specifies the URL corresponding to the URL request received by the URL request receiver 222 based on the connection relation information described above. In this example, the URL specifying unit 223 specifies the URL corresponding to the combination of the device identification information, the dealer information, and the regional information contained in the URL request received by the URL request receiver 222 based on the connection relation information stored in the connection relation information storing unit 221.

The URL transmitter 224 is an example of the "specification information transmitter" and transmits the URL specified by the URL specifying unit 223 to the MFP 1 as a response to the URL request received by the URL request receiver 222.

The functions of each element of the management server 2 described above (including the URL request receiver 222, the URL specifying unit 223, and the URL transmitter 224) are implemented when the CPU 211 executes the program stored in the ROM 212 or the like. However, without limiting thereto, for example, at least a part of the functions of each element of the management server 2 described above may be implemented using a dedicated hardware circuit (such as a semiconductor integrated circuit). In addition, the connection relation information storing unit 221 may be implemented using a subsidiary memory unit such as the ROM 212 or the HDD. Note that, in this example, each function of the URL request receiver 222 and the URL transmitter 224 is implemented by combining the CPU 211 and the communication I/F 214.

For example, the functions of each element of the management server 2 described above may be mounted in a plurality of servers in a distributed manner. That is, the management server 2 may include a plurality of servers (information processing apparatuses) having at least a part of the functions of the URL request receiver 222, the URL specifying unit 223, and the URL transmitter 224.

Figure 20:
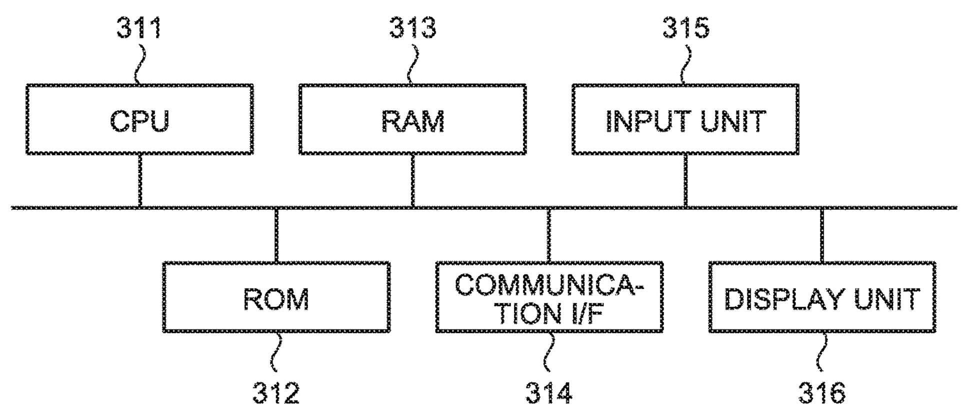
FIG. 20 is a diagram illustrating an exemplary hardware configuration of an app market server.

Next, a configuration of the app market server 3 will be described. FIG. 20 is a diagram illustrating an exemplary hardware configuration of the app market server 3. As illustrated in FIG. 20, the app market server 3 includes a CPU 311, a ROM 312, a RAM 313, a communication I/F 314, an input unit 315, and a display unit 316. Note that, although a minimum configuration according to the embodiment is illustrated here, a hardware configuration of the app market server 3 is not limited to such a configuration. The CPU 311 generally controls the operations of the app market server 3. The ROM 312 is a nonvolatile memory that stores various data such as a program. The RAM 313 is a volatile memory serving as a work area of various processes executed by the CPU 311. The communication I/F 314 is an interface for communication with the network 8. The input unit 315 is a device used to input a user's operation and includes, for example, a mouse or a keyboard. The display unit 316 is a device for displaying various types of information and may include, for example, a liquid crystal display device or the like.

Figure 21:
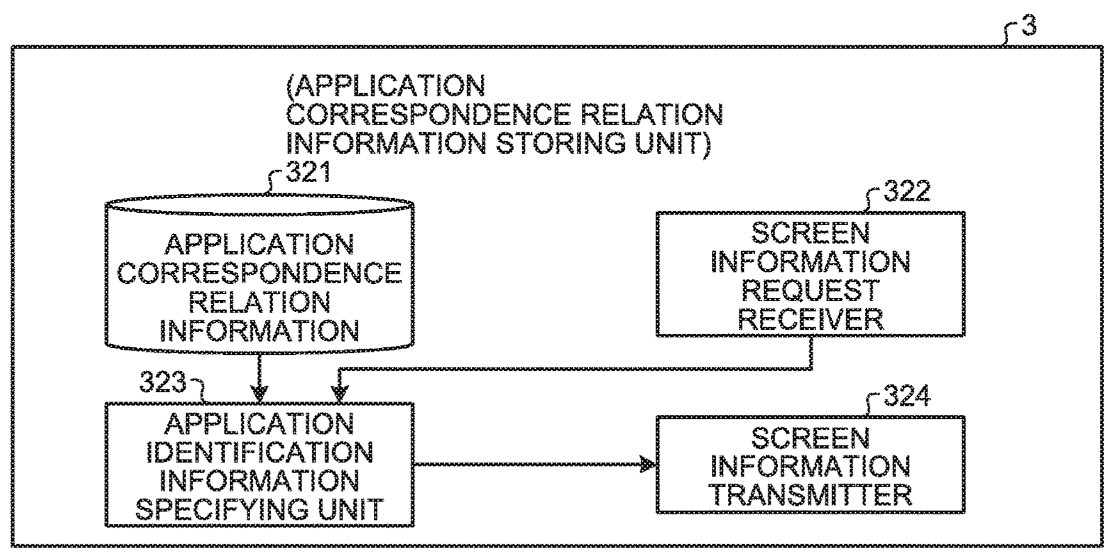
FIG. 21 is a diagram illustrating an exemplary function of the app market server.

FIG. 21 is a diagram illustrating an exemplary function of the app market server 3. As illustrated in FIG. 21, the app market server 3 has an application correspondence relation information storing unit 321, a screen information request receiver 322, an application identification information specifying unit 323, and a screen information transmitter 324. Although functions according to the embodiment are mainly illustrated in FIG. 21 for simplicity purposes, the functions of the app market server 3 are not limited thereto.

The application correspondence relation information storing unit 321 stores application correspondence relation information representing a correspondence relation between the dealer information and the application identification information for identifying an application available to the MFP 1. The application correspondence relation information according to the embodiment includes: first correspondence relation information in which each piece of device information is associated with the application identification information; and second correspondence relation information in which each combination of the regional information and the dealer information is associated with the application identification information for identifying an available application.

More specifically, the first correspondence relation information according to the embodiment is configured of: a device model ID table as illustrated in FIG. 22 in which the device identification information (serial number) is associated with a device model ID for identifying a unit for managing the device model; and correspondence relation information (referred to as third correspondence relation information for simplicity purposes) as illustrated in FIG. 23 in which each device model ID is associated with the application identification information. However, the present invention is not limited thereto. For example, the first correspondence relation information may be information in which each device identification information (that is, for each device information) is directly associated with the application identification information.

The second correspondence relation information according to the embodiment is configured of: an organization ID table as illustrated in FIG. 24 in which each combination of the regional information and the dealer information is associated with an organization ID representing the corresponding organization; and correspondence relation information (referred to as fourth correspondence relation information for simplicity purposes) as illustrated in FIG. 25 in which each organization ID is associated with the application identification information and availability information representing whether the application is available (whether the application can be downloaded to the MFP 1). However, the present invention is not limited thereto. For example, the second correspondence relation information may be information in which each combination of the regional information and the dealer information is directly associated with the application identification information for identifying an available application. The application correspondence relation information described above is assumed to be stored in the application correspondence relation information storing unit 321 in advance according to a user's (administrator's) operation of the app market server 3. As a method of setting the application correspondence relation information (registration method), various techniques known in the art may be employed.

FIG. 21 will be described continuously. The screen information request receiver 322 receives the aforementioned screen information request from the MFP 1. The application identification information specifying unit 323 specifies the application identification information corresponding to the dealer information contained in the screen information request received by the screen information request receiver 322 based on the aforementioned application correspondence relation information. More specifically, the application identification information specifying unit 323 refers to the first correspondence relation information described above so as to specify one or more pieces of the application identification information associated with the device information contained in the screen information request received by the screen information request receiver 322. Further, the application identification information specifying unit 323 refers to the second correspondence relation information described above so as to specify one or more pieces of the application identification information (application identification information for identifying an available application) associated with a combination of the dealer information and the regional information contained in the screen information request. Then, the application identification information specifying unit 323 specifies, as the application identification information for identifying an application available to the MFP 1, the application identification information associated with one or more pieces of the application identification information corresponding to the combination of the dealer information and the regional information contained in the screen information request out of one or more pieces of the application identification information associated with the device information contained in the screen information request.

In this example, the application identification information specifying unit 323 refers to the aforementioned device model ID table (FIG. 22) contained in the first correspondence relation information so as to specify the device model ID corresponding to the device identification information contained in the screen information request received by the screen information request receiver 322. Then, the application identification information specifying unit 323 refers to the aforementioned third correspondence relation information (FIG. 23) contained in the first correspondence relation information so as to specify the application identification information associated with the specified device model ID. In this manner, the application identification information specifying unit 323 specifies one or more pieces of the application identification information using the first correspondence relation information.

The application identification information specifying unit 323 refers to the aforementioned organization ID table (FIG. 24) contained in the second correspondence relation information so as to specify an organization ID corresponding to the combination of the regional information and the dealer information contained in the screen information request received by the screen information request receiver 322. Then, the application identification information specifying unit 323 refers to the aforementioned fourth correspondence relation information contained in the second correspondence relation information (refer to FIG. 25) so as to specify, as the application identification information for identifying the available application, the application identification information associated with the combination of the specified organization ID and the availability information representing that the application is "available". In this manner, the application identification information specifying unit 323 specifies one or more pieces of the application identification information using the second correspondence relation information.

The application identification information specifying unit 323 specifies, as application identification information for identifying an application available to the MFP 1 of the request source of the screen information request, the application identification information associated with one or more pieces of the application identification information specified using the second correspondence relation information out of one or more pieces of the application identification information specified using the first correspondence relation information.

FIG. 21 will be described continuously. The screen information transmitter 324 transmits, to the MFP 1, the screen information for providing the application identified by the application identification information specified by the application identification information specifying unit 323 as a response to the screen information request received by the screen information request receiver 322. In this example, the screen information transmitter 324 creates screen information for providing an application identified by the application identification information specified by the application identification information specifying unit 323 and transmits the created screen information to the MFP 1. In short, the screen information transmitter 324 has a function of transmitting, to the MFP 1, the screen information for providing the application specified by the dealer information contained in the screen information request as a response to the screen information request received by the screen information request receiver 322.

For example, the app market server 3 stores in advance the application detail information in which each application identification information is associated with the display information containing a display name, an introduction message, a display image, and the like in advance as illustrated in FIG. 26. The screen information transmitter 324 refers to this application detail information to thereby create the screen information containing the display information associated with the application identification information specified by the application identification information specifying unit 323. The screen information transmitter 324 transmits, to the MFP 1, the screen information (information serving as a source of the application list screen) including the aforementioned display information, various commands such as an installation command, layout information representing a layout of various display elements, and the like. The MFP 1 creates the application list screen based on the screen information received from the app market server 3 and displays the created application list screen on the operation panel 27.

The functions of each element of the aforementioned app market server 3 (including the screen information request receiver 322, the application identification information specifying unit 323, and the screen information transmitter 324) are implemented when the CPU 311 executes a program stored in the ROM 312 and the like. However, the present invention is not limited thereto. For example, at least a part of the functions of each element of the app market server 3 described above may be implemented using a dedicated hardware circuit (such as a semiconductor integrated circuit). In addition, the aforementioned application correspondence relation information storing unit 321 may be implemented using a subsidiary memory unit such as the ROM 312 or the HDD. Note that, in this example, the functions of the screen information request receiver 322 and the screen information transmitter 324 are implemented by combining the CPU 311 and the communication I/F 314.

For example, the functions of each element of the app market server 3 described above may be mounted in a plurality of servers in a distributed manner. That is, the app market server 3 may include a plurality of servers (information processing apparatuses) and may have at least a part of the functions of the screen information request receiver 322, the application identification information specifying unit 323, and the screen information transmitter 324 described above.

Figure 27:
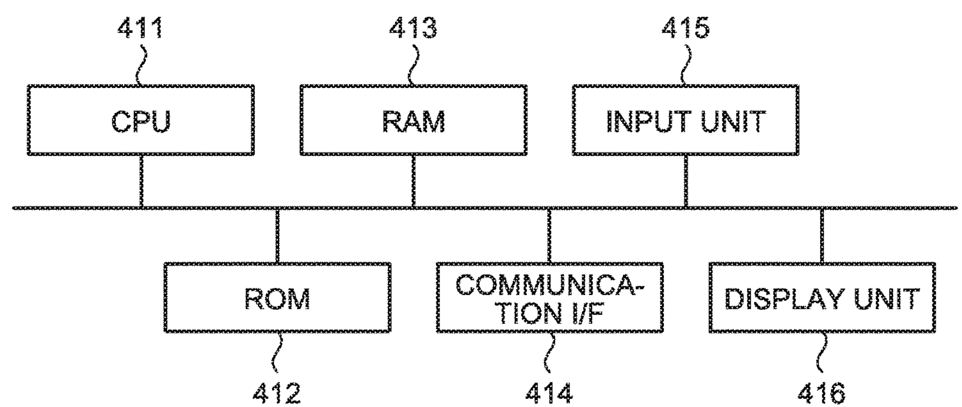
FIG. 27 is a diagram illustrating an exemplary hardware configuration of an application server.

Next, a configuration of the application server 7 will be described. FIG. 27 is a diagram illustrating an exemplary hardware configuration of the application server 7. As illustrated in FIG. 27, the application server 7 includes a CPU 411, a ROM 412, a RAM 413, a communication I/F 414, an input unit 415, and a display unit 416. Note that, although a minimum configuration according to the embodiment is illustrated here, the hardware configuration of the application server 7 is not limited thereto. The CPU 411 generally controls the operations of the application server 7. The ROM 412 is a nonvolatile memory that stores various data such as a program. The RAM 413 is a volatile memory serving as a work area of various processes executed by the CPU 411. The communication I/F 414 is an interface for communication with the network 8. The input unit 415 is a device used to input a user's operation and includes, for example, a mouse or a keyboard. The display unit 416 is a device for displaying various types of information and may include, for example, a liquid crystal display device or the like.

Figure 28:
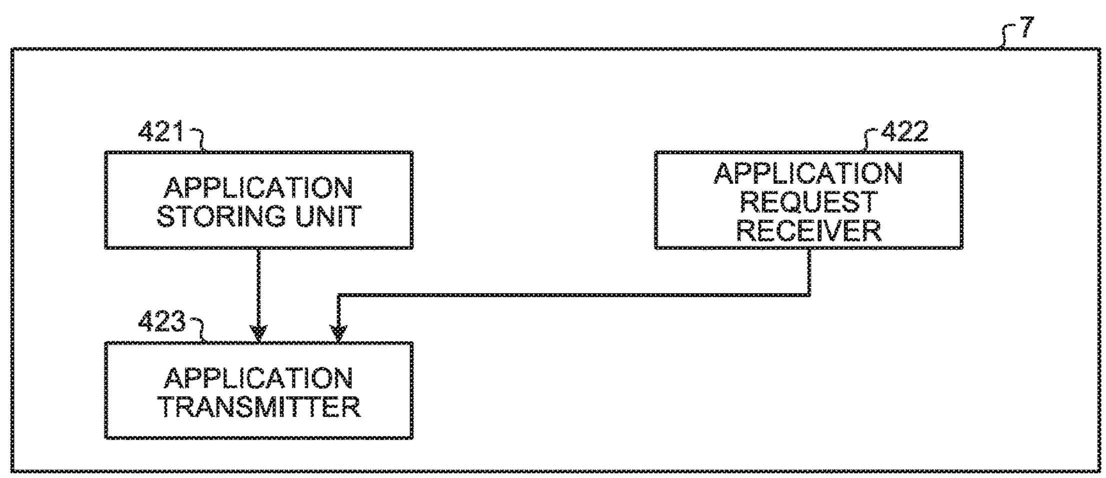
FIG. 28 is a diagram illustrating an exemplary function of the application server.

FIG. 28 is a diagram illustrating an exemplary function of the application server 7. As illustrated in FIG. 28, the application server 7 has an application storing unit 421, an application request receiver 422, and an application transmitter 423. Although FIG. 28 mainly illustrates the functions according to the embodiment for simplicity purposes, the functions of the application server 7 are not limited thereto.

The application storing unit 421 stores a plurality of applications. The application request receiver 422 receives the aforementioned application request from the MFP 1. The application transmitter 423 transmits the application requested by the application request received by the application request receiver 422 to the MFP 1 serving as a requesting source of the application request out of a plurality of applications stored in the application storing unit 421.

The functions of each element of the application server 7 described above (including the functions of the application request receiver 422 and the application transmitter 423) are implemented when the CPU 411 executes the program stored in the ROM 412 or the like. However, the present invention is not limited thereto. For example, at least a part of the functions of each element of the application server 7 described above may be implemented using a dedicated hardware circuit (such as a semiconductor integrated circuit). In addition, the application storing unit 421 may be implemented using a subsidiary memory unit such as the ROM 412 or the HDD. Note that, in this example, the functions of the application request receiver 422 and the application transmitter 423 are implemented by combining the CPU 411 and the communication I/F 414.

For example, the functions of each element of the application server 7 described above may be mounted in a plurality of servers in a distributed manner. That is, the application server 7 may include a plurality of servers (information processing apparatuses) having at least a part of the functions of the application request receiver 422 and the application transmitter 423 described above. Furthermore, for example, the application server 7 and the app market server 3 may be integrated into the same server.

Figure 29:
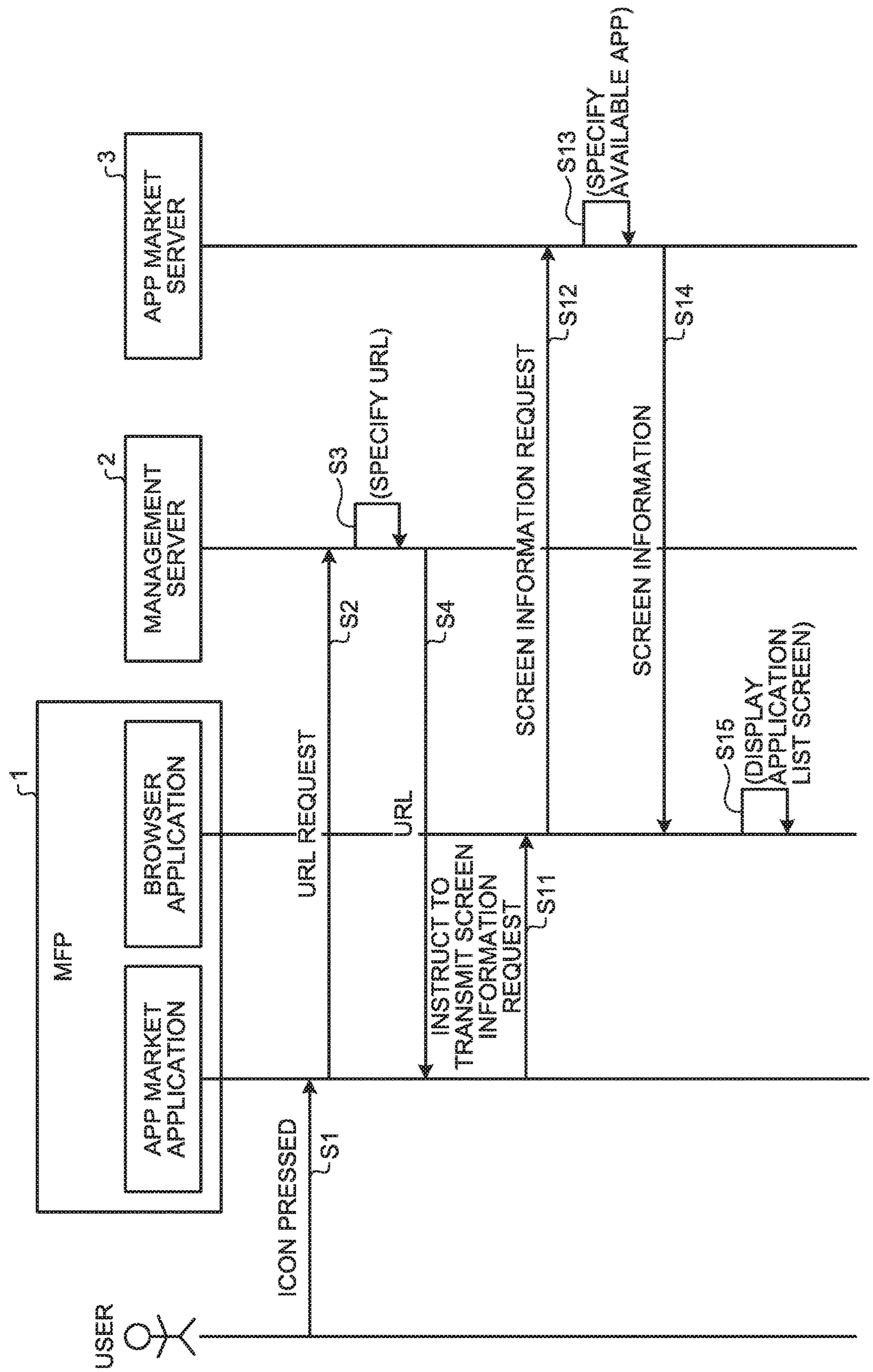
FIG. 29 is a sequence diagram illustrating an exemplary operation procedure of the information processing system.

FIG. 29 is a sequence diagram illustrating an exemplary operation procedure of the information processing system 100. Here, a description will be made about an operation procedure at the time of the second and subsequent activations of the app market application. First, if a user touches an icon 5 on the operational screen (refer to FIG. 5) (step S1), the app market application is activated. Then, the activated app market application transmits the aforementioned URL request including the regional information stored in the setting information storing unit 114 to the management server 2 (step S2).

The management server 2 having received the URL request specifies the URL corresponding to the regional information contained in the received URL request (step S3). Details of this process have been described above. Then, the management server 2 transmits the URL specified in step S3 as a response to the URL request (step S4).

Then, the app market application instructs the browser application to transmit the aforementioned screen information request to the app market server 3 specified by the URL received from the management server 2 in step S4 (step S11). The browser application having received this instruction transmits the aforementioned screen information request to the app market server 3 specified by the URL received from the management server 2 in step S4 (step S12).

The app market server 3 having received the screen information request specifies an application available to the MFP 1 by using, as a key, the dealer information, the regional information, the device information (in this example, the device identification information) contained in the received screen information request (step S13). Details of this process have been already described above. Then, the app market server 3 transmits the screen information for providing one or more applications specified in step S13 to the MFP 1 as a response to the screen information request (step S14). The MFP 1 having received the screen information as a response to the screen information request creates an application list screen based on the received screen information and displays this application list screen on the operation panel 27 (step S15).

Figure 30:
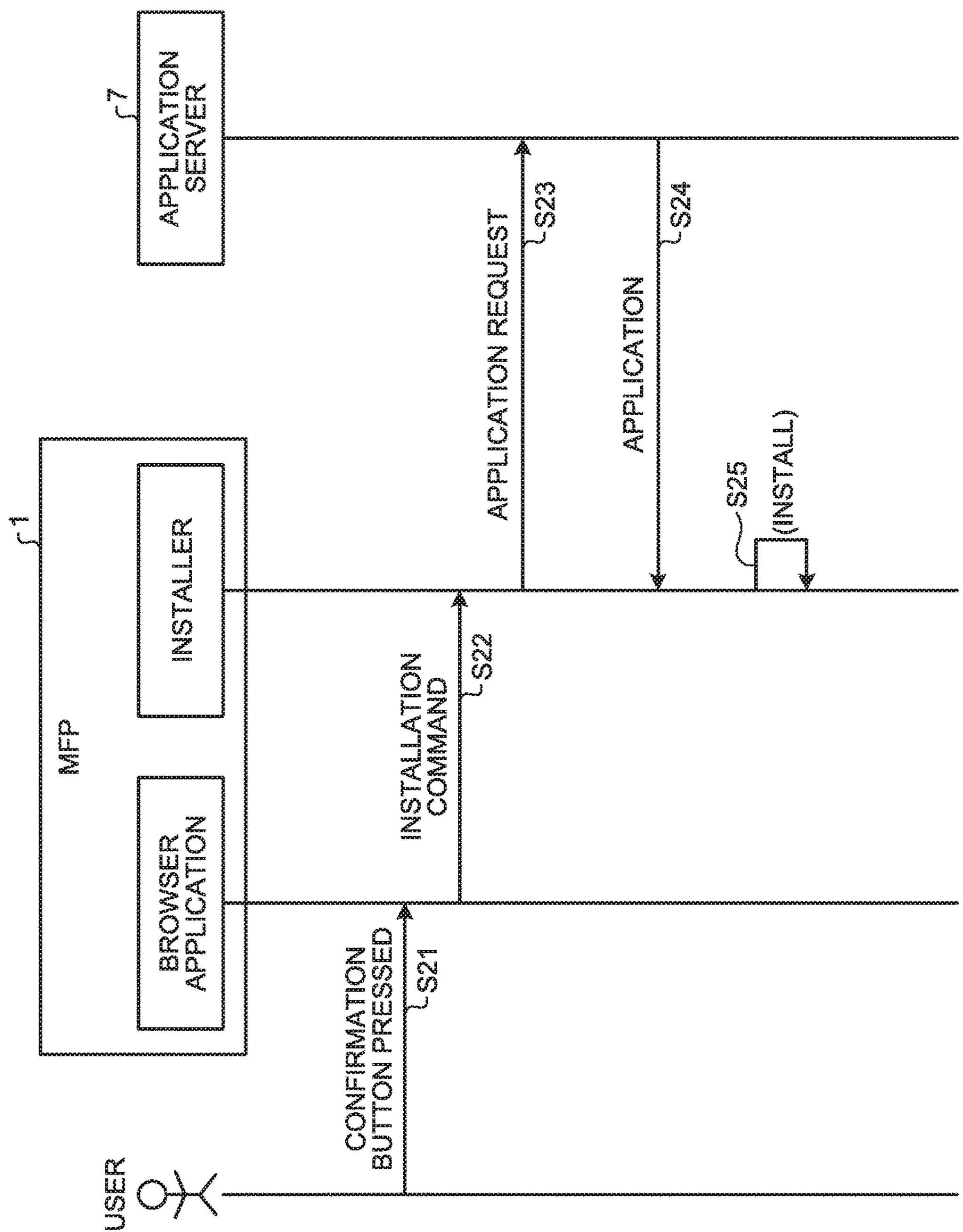
FIG. 30 is a sequence diagram illustrating an exemplary operation procedure of the information processing system.

FIG. 30 is a sequence diagram illustrating an exemplary operation procedure of the information processing system when a confirmation button 513 for confirming installation of any one of the applications on the application list screen is pressed. When a user presses the confirmation button 513 described above (step S21), the installation command attached to the confirmation button 513 is given to the installer as described above (step S22). The installer transmits the aforementioned application request to the application server 7 (step S23), and receives (downloads) the application from the application server 7 as a response thereto (step S24). Then, the installer performs control for installing the application received in step S24 in the MFP 1 (step S25).

As described above, according to the embodiment, the MFP 1 transmits, to the app market server 3, the screen information request that contains the dealer information representing a dealer that sells the MFP 1 and is used to request the screen information for providing the application. The app market server 3 specifies the application identification information corresponding to the dealer information contained in the screen information request received from the MFP 1 based on the application correspondence relation information representing a correspondence relation between the dealer information and the application identification information for identifying the application available to the MFP 1. The app market server 3 transmits, to the MFP 1, the screen information for providing the application identified by the specified application identification information. Therefore, according to the embodiment, even when the application used by the MFP 1 is different for each dealer that sells the MFP 1, only applications properly available to the MFP 1 are displayed on the application list screen on the operation panel 27 of the MFP 1. Therefore, it is possible to introduce applications properly available to the MFP 1.

Furthermore, according to the embodiment described above, for example, even when the app market server 3 for providing the application list screen to any MFP 1 is changed depending on a change of the number of app market servers 3 or the management area, the management server 2 can store the aforementioned connection relation information (information representing a correspondence relation between the regional information and the URL) by reflecting such a change. Therefore, the MFP 1 can obtain the URL for specifying the application server 7 serving as a communication destination regardless of a condition of the side that provides the application list screen.

Second Embodiment

Next, a second embodiment will be described. Description of common part with the above described first embodiment will be omitted. Connection relation information according to the second embodiment is different from that of the first embodiment in that each piece of the dealer information is associated with the URL (the URL that specifies a location of the corresponding app market server 3 in the network 8). FIG. 31 is a diagram illustrating exemplary connection relation information according to the second embodiment. Without limiting thereto, for example, the connection relation information may be information in which each combination of the dealer information and the regional information is associated with the URL.

In short, it is sufficient that the connection relation information is information representing a correspondence relation between the URL that specifies the app market server 3 serving as a communication destination of the MFP 1 and at least one of the dealer information, the regional information, and the device information. Other parts are similar to those of the first embodiment described above.

Third Embodiment

Next, a third embodiment will be described. Description of common part with the above described embodiments will be omitted. Connection relation information according to the third embodiment is different from that of the first embodiment in that each piece of the device information is associated with the URL (the URL that specifies a location of the corresponding app market server 3 in the network 8). FIG. 32 is a diagram illustrating exemplary connection relation information according to the third embodiment. In the example of FIG. 32, the connection relation information is information in which each piece of device identification information (each piece of the device information) with the URL. However, the present invention is not limited thereto. For example, the connection relation information may be information in which each combination of the device information and the regional information is associated with the URL, or may be information in which each combination of the device information and the dealer information is associated with the URL. Alternatively, the connection relation information may be information in which each combination of the device information, the regional information, and the dealer information is associated with the URL.

In short, it is sufficient that the connection relation information is information representing a correspondence relation between the URL specifying the app market server 3 serving as a communication destination of the MFP 1 and at least one of the dealer information, the regional information, and the device information. Other parts are similar to those of the first embodiment described above.

In the embodiments described above, the main body 10 and the operation unit 20 are operated independently using other operating systems. However, the present invention is not limited thereto. For example, the main body 10 and the operation unit 20 may be operated using the same operating system. That is, the main body 10 and the operation unit 20 may be integrated into a single body.

The program executed in the information processing system 100 according to the embodiments described above (including the MFP 1, the management server 2, the app market server 3, and the application server 7) may be recorded in a computer readable recording medium such as a compact disc read-only memory (CD-ROM), a flexible disk (FD), a CD-recordable (CD-R), a digital versatile disk (DVD), and a universal serial bus (USB) in an installable or executable file format or may be provided in a distributed format through a network such as the Internet. In addition, various programs may be integrated into a ROM and the like in advance.

According to the present invention, it is possible to introduce an application properly available to the device.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing system comprising:

an image forming apparatus; and a server system configured to connect to the image forming apparatus through a network, wherein the server system includes at least one first memory and at least one first processor, the at least one first memory containing computer readable code executable by the at least one first processor to, receive, from the image forming apparatus, a screen information request used to request a screen information for providing at least one application, the screen information request including at least regional information representing a region where the image forming apparatus is used, identify an application available to the image forming apparatus by determining an application corresponding to the regional information such that only applications associated with the regional information that represents the region where the image forming apparatus is used are displayed to a user on a screen of the image forming apparatus, and transmit, to the image forming apparatus, the screen information as a response to the screen information request, and the image forming apparatus includes at least one second memory and at least one second processor, the at least one second memory containing computer readable code executable by the at least one second processor to, transmit the screen information request to the server system, receive the screen information from the server system as a response to the screen information request, control displaying of the screen based on the screen information, receive, from the user of the image forming apparatus, a selection of an application available to the image forming apparatus as identified by the server system, download, via the server system, the application, and install the application on the image forming apparatus such that only the applications, associated with the regional information representing the region where the image forming apparatus is used, are downloaded and installed on the image forming apparatus.

2. The information processing system according to claim 1, wherein the screen information request further includes device information that specifies the image forming apparatus and dealer information representing a dealer that sold the image forming apparatus, and the server system is configured to identify the application available to the image forming apparatus based on an application correspondence relation information representing a correspondence relation between the regional information and application identification information, wherein the application correspondence relation information includes, first correspondence relation information in which each piece of device information is associated with the application identification information, and second correspondence relation information in which each combination of the regional information and the dealer information is associated with the application identification information identifying the application.

3. The information processing system according to claim 2, wherein the image forming apparatus is configured to, refer to the first correspondence relation information to specify one or more pieces of the application identification information associated with the device information included in the screen information request, refer to the second correspondence relation information to specify one or more pieces of the application identification information associated with the combination of the dealer information and the regional information included in the screen information request, and specify, as the application identification information identifying the application available to the image forming apparatus, the application identification information associated with one or more pieces of the application identification information corresponding to the combination of the dealer information and the regional information contained in the screen information request, out of one or more pieces of the application identification information associated with the device information included in the screen information request.

4. The information processing system according to claim 2, wherein the device information is device identification information for uniquely identifying the image forming apparatus.

5. The information processing system according to claim 2, wherein the second processor of the image forming apparatus is further configured to, set the dealer information or the regional information according to an input for indicating the dealer information or the regional information, and control storage of the dealer information or the regional information.

6. The information processing system according to claim 2, further comprising:

a management server configured to manage connection relation information representing a correspondence relation between specification information specifying the image forming apparatus serving as a communication destination of the image forming apparatus and at least one of (i) the dealer information, (ii) the regional information, and (iii) the device information, the management server including, a third memory configured to store the connection relation information; and a third processor configured to, receive, from the image forming apparatus, a specification information request that contains at least one of the dealer information, the regional information, and the device information;

specify the specification information corresponding to the specification information request based on the connection relation information; and transmit, to the image forming apparatus, the specification information as a response to the specification information request, wherein the second processor of the image forming apparatus is further configured to, transmit the specification information request to the management server, and receive the specification information from the management server as a response to the specification information request, and transmit the screen information request to the image forming apparatus specified by the specification information.

7. The information processing system according to claim 6, wherein the specification information is a uniform resource locator.

8. The information processing system according to claim 6, wherein the specification information is at least one of an IP address and a domain name.

9. The information processing system according to claim 1, wherein the image forming apparatus is configured to display, on the screen, a request for an input of the regional information, and to transmit the screen information request including the input of the regional information to the server system.

10. An image forming apparatus configured to connect to a server system through a network, the image forming apparatus comprising:

at least one memory and at least one processor, the at least one memory containing computer readable code executable by the at least one processor to, transmit, to the server system, a screen information request used to request screen information for providing at least one application, the screen information including at least regional information representing a region where the image forming apparatus is used, receive the screen information for providing an application specified by the regional information from the server system as a response to the screen information request such that only applications associated with the region where the image forming apparatus is used are available to the image forming apparatus and displayed to a user on a screen of the image forming apparatus, wherein the server system identifies the applications that are available to the image forming apparatus by determining an application corresponding to the regional information based on application correspondence relation information representing a correspondence relation between the regional information and the application, control displaying of the screen corresponding to the screen information, receive, from the user of the image forming apparatus, a selection of the application available to the image forming apparatus as identified by the server system, download, via the server system, the application, and install the application on the image forming apparatus such that only the applications associated with the region where the image forming apparatus is used are downloaded and installed on the image forming apparatus.

11. The image forming apparatus according to claim 10, further comprising:

a main body including at least one of a plotter and a scanner; and a control panel configured to, receive a user's operation, transmit the screen information request and reception of the screen information, and display a list of the applications that are available to the image forming apparatus.

12. The image forming apparatus according to claim 11, wherein, at least at a time of first activation, the controller panel is configured to execute a list display application to receive an input of the regional information and to add the regional information to the screen information request.

13. A method of processing information by an image forming apparatus, the image forming apparatus configured to connect to server system through a network, the method comprising:

transmitting, to the server system, a screen information request to request screen information for providing at least one application, the screen information including at least regional information representing a region where the image forming apparatus is used;

receiving the screen information from the server system as a response to the screen information request such that only applications associated with the region where the image forming apparatus is used are available to the image forming apparatus and displayed to a user on a screen of the image forming apparatus, wherein the server system identifies the applications that are available to the image forming apparatus by determining an application corresponding to the regional information based on application correspondence relation information representing a correspondence relation between the regional information and the application;

controlling displaying of the screen based on the screen information received in the receiving;

receiving, from the user of the image forming apparatus, a selection of the application available to the image forming apparatus as identified by the server system;

downloading, via the server system, the application; and installing the application on the image forming apparatus such that only the applications associated with the region where the image forming apparatus is used are downloaded and installed on the image forming apparatus.

14. The method of processing information according to claim 13, further comprising:

receiving, by the server system, the screen information request from the image forming apparatus;

specifying, by the server system, application identification information corresponding to the regional information included in the screen information request based on application correspondence relation information representing a correspondence relation between the regional information and application identification information for identifying an application available to the image forming apparatus; and transmitting, by the server system, the screen information to the image forming apparatus, the screen information for providing an application identified by the application identification information specified in the specifying as a response to the screen information request.

* * * * *